(12) United States Patent
Saito et al.

(10) Patent No.: US 12,104,099 B2
(45) Date of Patent: Oct. 1, 2024

(54) BONDED STRUCTURE AND METHOD FOR PRODUCING SAME

(71) Applicant: DENSO CORPORATION, Kariya (JP)

(72) Inventors: Masami Saito, Kariya (JP); Koji Kondo, Kariya (JP); Hirotaka Miyano, Kariya (JP)

(73) Assignee: DENSO CORPORATION, Kariya (JP)

( * ) Notice: Subject to any disclaimer, the term of this patent is extended or adjusted under 35 U.S.C. 154(b) by 498 days.

(21) Appl. No.: 17/369,743

(22) Filed: Jul. 7, 2021

(65) Prior Publication Data

US 2021/0332267 A1 Oct. 28, 2021

Related U.S. Application Data

(63) Continuation of application No. PCT/JP2019/043575, filed on Nov. 7, 2019.

(30) Foreign Application Priority Data

Jan. 9, 2019 (JP) .................................. 2019-001657

(51) Int. Cl.
*C09J 5/02* (2006.01)
*C09J 5/06* (2006.01)
*C09J 163/00* (2006.01)
*F16B 11/00* (2006.01)

(52) U.S. Cl.
CPC . *C09J 5/02* (2013.01); *C09J 5/06* (2013.01); *C09J 163/00* (2013.01); *C09J 2400/146* (2013.01); *C09J 2400/163* (2013.01); *F16B 11/006* (2013.01)

(58) Field of Classification Search
CPC ..... C09J 5/02; C09J 5/06; C09J 163/00; C09J 2400/146; C09J 2400/163; C09J 2463/00; C09J 7/50; C09J 7/28; F16B 11/006; B32B 15/04; B32B 15/08; B32B 15/20; B32B 27/00; C23C 22/66
See application file for complete search history.

(56) References Cited

U.S. PATENT DOCUMENTS

| | | | |
|---|---|---|---|
| 2013/0209690 A1* | 8/2013 | Bautista Mester | C09D 167/02 427/327 |
| 2015/0217545 A1 | 8/2015 | Endo et al. | |
| 2018/0216235 A1 | 8/2018 | Takahashi et al. | |

FOREIGN PATENT DOCUMENTS

| | | |
|---|---|---|
| CN | 104540674 A | 4/2015 |
| JP | 2017203208 A | 11/2017 |
| JP | 2017203213 A | 11/2017 |
| JP | 2018070940 A | 5/2018 |

* cited by examiner

*Primary Examiner* — Cynthia L Schaller
(74) *Attorney, Agent, or Firm* — Harness, Dickey & Pierce, P.L.C.

(57) ABSTRACT

A bonded structure has a first substrate composed of aluminum or an aluminum alloy, a first thin film layer formed on the surface of the first substrate, and a resin adhesive layer bonded to the surface of the first thin film layer. The first thin film layer is composed of silicate glass that has a metal element with different valency from Si as a solid solution. The resin adhesive layer includes a resin including a structural site derived from ionic polymerization or a resin capable of dehydration condensation.

12 Claims, 18 Drawing Sheets

FIG.8
(a) 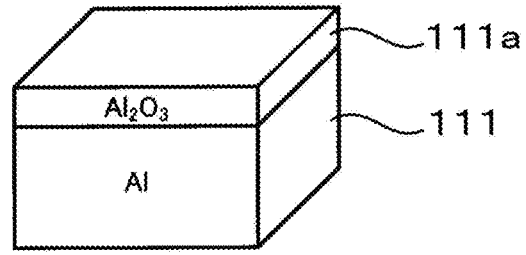
(b) 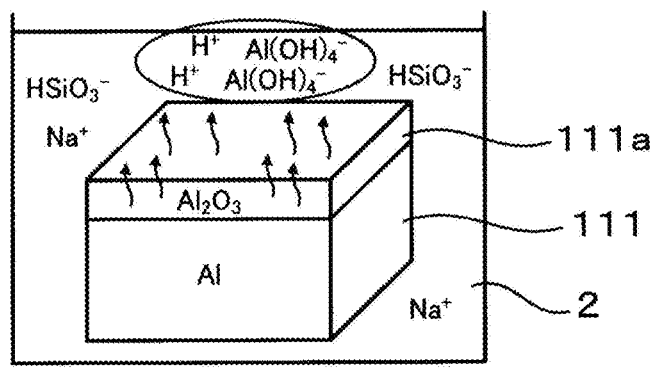
(c) 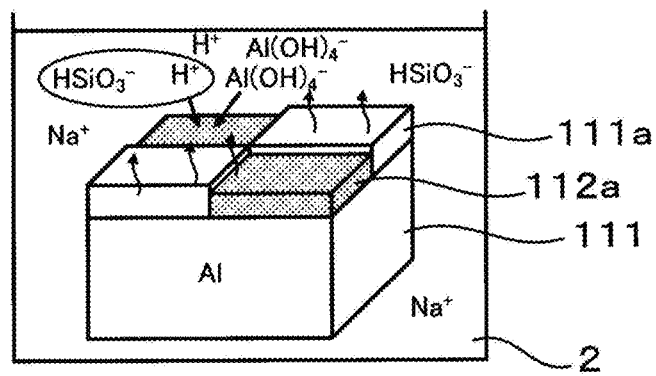
(d) 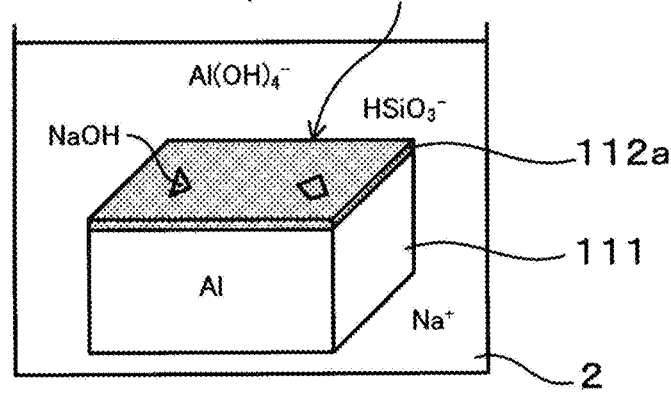

FIG.9
(a)
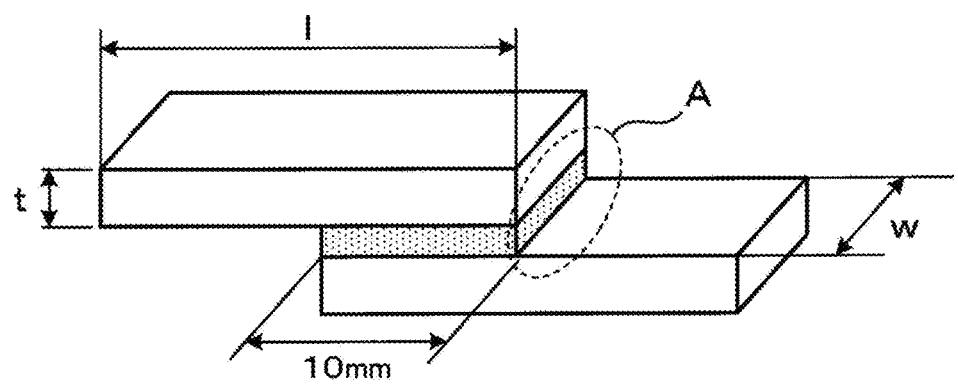
(b)
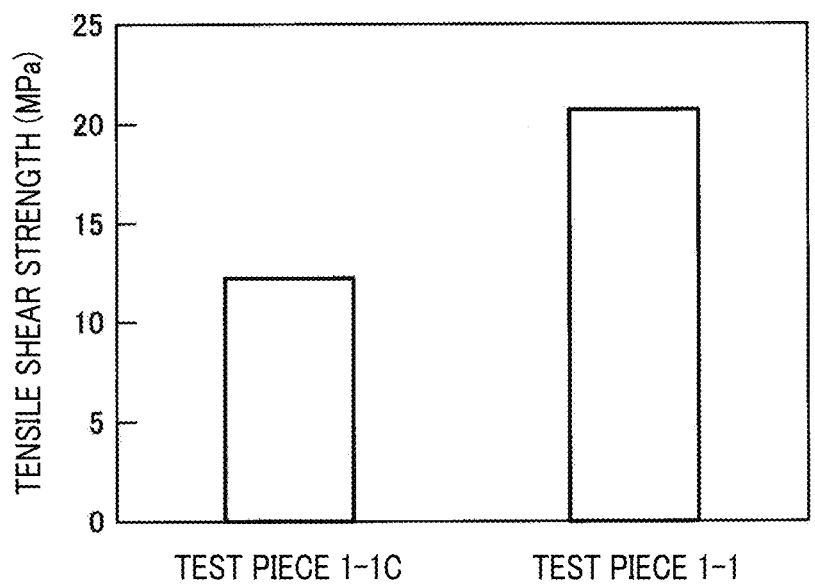

FIG.12
(a)
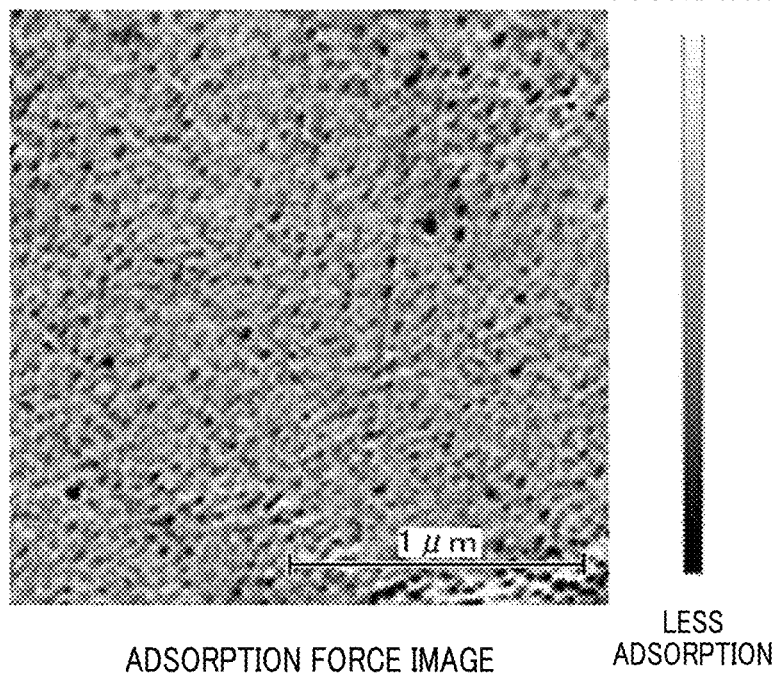
ADSORPTION FORCE IMAGE
(b)
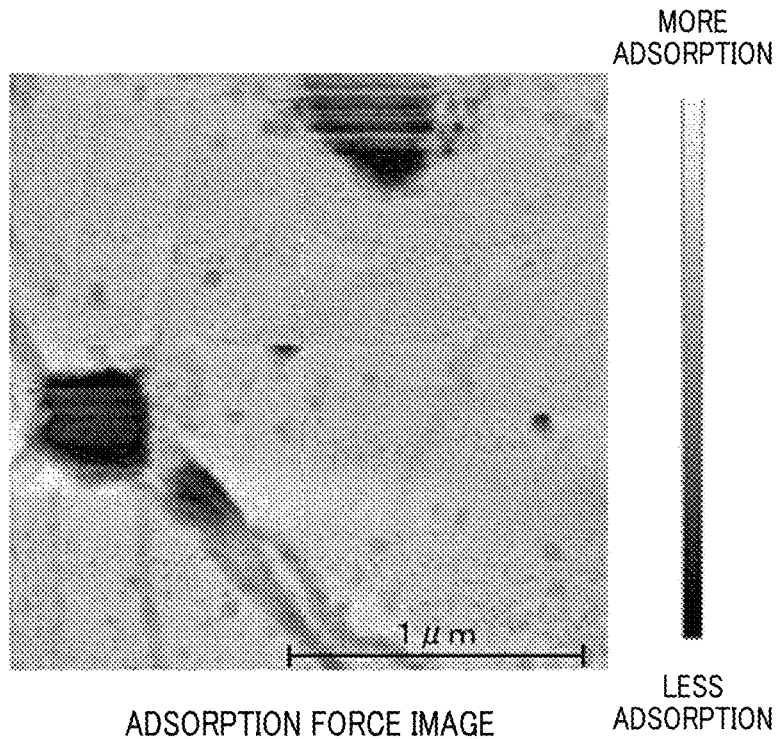
ADSORPTION FORCE IMAGE

BONDED STRUCTURE AND METHOD FOR PRODUCING SAME

CROSS-REFERENCE TO RELATED APPLICATION

The present application is a continuation application of International Application No. PCT/JP2019/043575 filed on Nov. 7, 2019, which is based on and claims the benefit of priority from Japanese Patent Application 2019-001657 filed on Jan. 9, 2019. The contents of these applications are incorporated herein by reference in their entirety.

BACKGROUND

The present disclosure relates to a bonded structure and a method for producing the bonded structure.

Conventionally, bonded structures composed of aluminum alloy substrates bonded to each other with a resin adhesive layer have been widely known.

SUMMARY

An aspect of the present disclosure is a bonded structure including:
- a first substrate composed of aluminum or an aluminum alloy;
- a first thin film layer; and
- a resin adhesive layer,
- where the first thin film layer is composed of silicate glass that has a metal element with different valency from Si as a solid solution, and
- the resin adhesive layer includes a resin including a structural site derived from ionic polymerization or a resin capable of dehydration condensation.

It is to be noted that the reference signs in the parenthesis, mentioned in the claims, are intended to the correspondence relations with the specific means described in the embodiments described later, but not intended to limit the technical scope of the present disclosure.

BRIEF DESCRIPTION OF THE DRAWINGS

The above-mentioned objects of the present disclosure, and other objects, features, and advantages will become more apparent from the following description with reference to the accompanying drawings below.

FIG. 8 is an illustration diagram illustrating, with a specific example, a preparation step in a method for producing a bonded structure according to Embodiment 3.

FIG. 9 is an illustration diagram of bonding strength evaluation in Experimental Example 1, where FIG. 9($a$) is a diagram illustrating a test piece for measuring tensile shear strength, and FIG. 9($b$) is a diagram showing the results of the bonding strength evaluation.

FIG. 12 shows the results of surface observation with a scanning probe microscope with a surface-modified probe in Experimental Example 3, where FIG. 12($a$) is an adsorption force image of the surface of a sample 2-1C subjected to no silicate treatment, and FIG. 12($b$) is an adsorption force image of the surface of a sample 2-1 subjected to a silicate treatment.

DETAILED DESCRIPTION OF THE PREFERRED EMBODIMENTS

Figure 1:
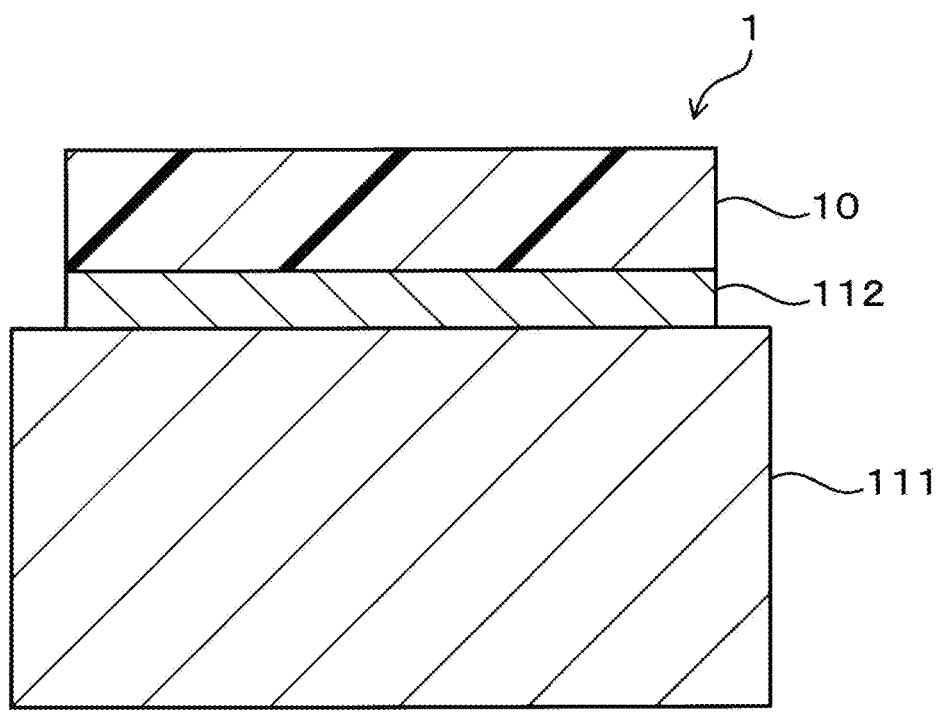
FIG. 1 is a schematic diagram illustrating a bonded structure according to Embodiment 1.

Previous JP 2018-70940 A discloses herein a bonded structure including an aluminum alloy substrate, an alkali alternating-current electrolytic oxide film formed on the surface of the substrate, and a thermoplastic resin molded body bonded on the alkali alternating-current electrolytic oxide film, and including a structure with the thermoplastic resin molded body partially in a small hole at the surface of the alkali alternating-current electrolytic oxide film.

For conventional bonded structures widely known, bonding is achieved by an anchor effect of a resin constituting a resin adhesive layer in the surface irregularity of a substrate surface. The bonding achieved by such an anchor effect, however, varies in strength depending on the condition of the surface irregularity. Thus, it is difficult for the substrate and the resin adhesive layer to be bonded strongly.

An object of the present disclosure is to provide a bonded structure capable of strongly bonding a substrate made of aluminum or an aluminum alloy and a resin adhesive layer, and a production method that is suitable for the production of the bonded structure.

An aspect of the present disclosure is a bonded structure including:
- a first substrate composed of aluminum or an aluminum alloy;
- a first thin film layer formed on the surface of the first substrate; and
- a resin adhesive layer bonded to the surface of the first thin film layer,
- where the first thin film layer is composed of silicate glass that has a metal element with different valency from Si, as a solid solution, and
- the resin adhesive layer includes a resin including a structural site derived from ionic polymerization or a resin capable of dehydration condensation.

Another aspect of the present disclosure is a method for producing a bonded structure, which includes:
- a preparation step of bringing a first substrate of aluminum or an aluminum alloy, with an oxide film layer of $Al_2O_3$ formed at the surface of the first substrate, into contact with an alkaline silicate solution to convert the oxide film layer into a first thin film layer of silicate glass that has a metal element with different valency from Si as a solid solution, thereby preparing the first substrate of the aluminum or the aluminum alloy with the first thin film layer formed at the surface of the first substrate;
- a stacking step of obtaining a stacked body where the first thin film layer at the first substrate and a resin adhesive material layer formed from a resin adhesive material that is subjected to curing to serve as a resin including a structural site derived from ionic polymerization or a resin capable of dehydration condensation are stacked in order; and
- a bonding step of heating the stacked body to cause a chemical reaction at the interface between the first thin film layer and the resin adhesive material layer, and further raising the heating temperature to cure the resin adhesive material layer, thereby forming a resin adhesive layer bonded to the surface of the first thin film layer.

The bonded structure mentioned above has the configuration mentioned above. Thus, the bonded structure allows the first substrate composed of aluminum or an aluminum alloy and the resin adhesive layer to be bonded strongly. This is believed be because of the following reasons.

The silicate glass of the first thin film layer where the metal element with different valency from Si is present as a solid solution has, at the surface thereof, anionic sites or cationic sites produced by the solid solution of the metal element and active sites such as $O^-$ and OH groups (hydroxyl groups) at a stage before bonding the first thin film layer and the resin adhesive layer. In addition, the resin including the structural site derived from ionic polymerization is capable of causing ionic reactions with anionic sites in the silicate glass or ionic reactions with cationic sites therein in bonding the first thin film layer and the resin adhesive layer. Thus, in the case where the resin adhesive layer includes the resin including the structural site derived from ionic polymerization, the first thin film layer and the resin adhesive layer can be bonded by ionic bonds. In addition, the resin capable of dehydration condensation, which has OH groups, is capable of causing dehydration condensation reactions with OH groups of the silicate glass surface in bonding the first thin film layer and the resin adhesive layer. Thus, in the case where the resin adhesive layer includes the resin capable of dehydration condensation, the first thin film layer and the resin adhesive layer can be bonded by covalent bonds.

On the other hand, a chemical bond (Al—Si bond) between the Al element contained in the first substrate and the Si element of the first thin film layer and/or a chemical bond (Al—O bond) between the Al element contained in the first substrate and the O element of the first thin film layer can be formed between the first substrate and the first thin film layer. Accordingly, the bonded structure allows the first substrate composed of aluminum or an aluminum alloy and the resin adhesive layer to be bonded strongly.

The above-mentioned method for producing the bonded structure has the steps mentioned above. Thus, the method is capable of producing a bonded structure where the first substrate composed of aluminum or an aluminum alloy and the resin adhesive layer are bonded strongly. In addition, in ordinary circumstances, aluminum or an aluminum alloy has, even after removing the oxide film layer thereof, another oxide film layer formed immediately, and the adequate removal of the oxide film layer is thus difficult. In the preparation step mentioned above, the removal of the oxide film layer and the production of the first thin film layer are achieved simultaneously, thus making the oxide film layer less likely to be left between the first substrate and the first thin film layer. Accordingly, the above-mentioned method for producing the bonded structure is capable of ensuring the chemical bond between the first substrate and the first thin film layer. Furthermore, according to the bonding step mentioned above, the chemical reaction is caused at the interface between the first thin film layer and the resin adhesive material layer at a temperature that is lower than the curing temperature of the resin adhesive material. Accordingly, the above-mentioned method for producing the bonded structure is capable of suppressing thermal degradation due to the overheated resin adhesive layer.

Embodiment 1

A bonded structure according to Embodiment 1 will be described with reference to FIGS. 1 to 5. As illustrated in FIG. 1, the bonded structure 1 according to Embodiment 1 has a first substrate 111, a first thin film layer 112, and a resin adhesive layer 10. This will be described in detail below.

The first substrate 111 is composed of aluminum or an aluminum alloy (hereinafter, referred to collectively as an aluminum alloy or the like). Specific examples of the first substrate 111 can include substrates for members in various shapes, composed of aluminum or an aluminum alloy. Examples of the aluminum alloy can include 1000 series Al alloys, 2000 series Al alloys, 3000 series Al alloys, 4000 series Al alloys, 5000 series Al alloys, 6000 series Al alloys, and 7000 series Al alloys. Examples of the members in various shapes can include a tubular member, a member with a hole through which a tubular member is inserted, and a plate-shaped member.

The first thin film layer 112 is formed on the surface of the first substrate 111. The first thin film layer 112 is disposed between the first substrate 111 and the adhesive resin layer 10, and bonded to the first substrate 111 and the adhesive resin layer 10. The first thin film layer 112 is provided on, specifically, a bonded part of the surface of the first substrate 111, to which the resin adhesive layer 10 is bonded. More specifically, depending on the size of the bonded part, the first thin film layer 112 may be formed partially on the surface of the first substrate 111, or may be formed entirely on the surface of the first substrate 111. The part of the surface (the surface of an aluminum alloy or the like) of the first substrate 111, on which the first thin film layer 112 is formed, is basically not covered with any oxide film layer. It is to be noted that an oxide film layer may be present as long as the advantageous effects of the present disclosure are achieved.

The first thin film layer 112 is composed of silicate glass. In silicate glass, a metal element that has difference valency from Si (silicon) is present as a solid solution. Specific examples of the metal element can include Al (aluminum), Mg (magnesium), Na (sodium), Zn (zinc), and Ni (nickel). One, or two or more of these elements may be present as a solid solution. It is to be noted that the metal element can contain at least an Al element. This composition has advantages such as improving the activity of the silicate glass surface and facilitating the formation of the first thin film layer 112 by silicate treatment of an aluminum alloy or the like that has, at the surface thereof, an oxide film layer of $Al_2O_3$ formed. It is to be noted that silicate glass with an Al element present as a solid solution is typically referred to as aluminosilicate glass. In addition, the silicate glass can be made anionic in the case where the valency of the metal element is smaller than the valency of Si, whereas the silicate glass can be made cationic in the case where the valency of the metal element is larger than the valency of Si.

The resin adhesive layer 10 includes a resin including a structural site derived from ionic polymerization or a resin capable of dehydration condensation.

The resin including a structural site derived from ionic polymerization may include a structural site derived from polymerization other than ionic polymerization, as long as the resin includes one or more structural units derived from ionic polymerization. In addition, the structural site derived from ionic polymerization can include not only a molecular structural moiety of the resin, but also a curing agent or a reaction auxiliary for use in resin polymerization. It is to be noted that the ionic polymerization may be any of cationic polymerization and anionic polymerization. Specific examples of the resin including the structural site derived from ionic polymerization can include epoxy resins, polyurethane resins, melamine resins, and urea resins. Among these resins, the epoxy resins are preferred. The epoxy resin material is, because of having an epoxy group, capable of forming ionic bonds through ionic reactions (the corresponding cationic site is $C^+$) with anionic sites such as $O^-$ and $Al^-$ of the first thin film layer, and furthermore capable of forming covalent bonds through chemical reactions with OH groups of the first film layer in bonding the first thin film layer and the resin adhesive layer. Thus, this composition makes it easier to achieve strong bonding strength. It is to be noted that in the case where the resin including the structural site derived from ionic polymerization is an epoxy resin, the structural site derived from ionic polymerization may be a main agent site derived from the main agent of the epoxy resin material, or may be a curing agent site derived from the curing agent thereof.

The resin capable of dehydration condensation basically has OH groups (hydroxyl groups). Accordingly, the resin capable of dehydration condensation is capable of causing a dehydration condensation reaction (also referred to as a silanol reaction) with OH groups (also referred to as Si—OH groups) present on the silicate glass surface in bonding the first thin film layer and the resin adhesive layer. Specific examples of the resin capable of dehydration condensation can include silicone resins and polyester resins. Among these resins, the silicone resins are preferred from the perspective of favorable condensation reactivity.

The bonded structure 1 has the configuration mentioned above. Thus, the bonded structure 1 allows the first substrate 111 composed of aluminum or an aluminum alloy and the resin adhesive layer 10 to be bonded strongly. This is believed be because of the following reasons.

The silicate glass of the first thin film layer 112 where the metal element with different valency from Si is present as a solid solution has, at the surface thereof, anionic sites or cationic sites produced by the solid solution of the metal element and active sites such as $O^-$ and OH groups (hydroxyl groups) at a stage before bonding the first thin film layer 112 and the resin adhesive layer 10. In addition, the resin including the structural site derived from ionic polymerization is capable of causing ionic reactions with anionic sites in the silicate glass or ionic reactions with cationic sites therein in bonding the first thin film layer 112 and the resin adhesive layer 10. Thus, in the case where the resin adhesive layer 10 includes the resin including the structural site derived from ionic polymerization, the first thin film layer 112 and the resin adhesive layer 10 can be bonded by ionic bonds. In addition, the resin capable of dehydration condensation, which has OH groups, is capable of causing dehydration condensation reactions with OH groups of the silicate glass surface in bonding the first thin film layer 112 and the resin adhesive layer 10. Thus, in the case where the resin adhesive layer 10 includes the resin capable of dehydration condensation, the first thin film layer 112 and the resin adhesive layer 10 can be bonded by covalent bonds.

In contrast, a chemical bond (Al—Si bond) between the Al element contained in the first substrate 111 and the Si element of the first thin film layer and/or a chemical bond (Al—O bond) between the Al element contained in the first substrate 111 and the O element of the first thin film layer 112 can be formed between the first substrate 111 and the first thin film layer 112. Accordingly, the bonded structure 1 allows the first substrate 111 composed of aluminum or an aluminum alloy and the resin adhesive layer 10 to be bonded strongly.

The linkage between the first thin film layer 112 and the resin adhesive layer 10 in the above-described operational effect of the bonded structure 1 will be more specifically described with reference to FIGS. 2 to 5. First, a case where the first thin film layer 112 is composed of aluminosilicate glass that is silicate glass with an Al element present as a solid solution, whereas the resin adhesive layer 10 includes an epoxy resin as the resin including the structural site derived from ionic polymerization will be described as an example with reference FIGS. 2 to 4.

Figure 2:
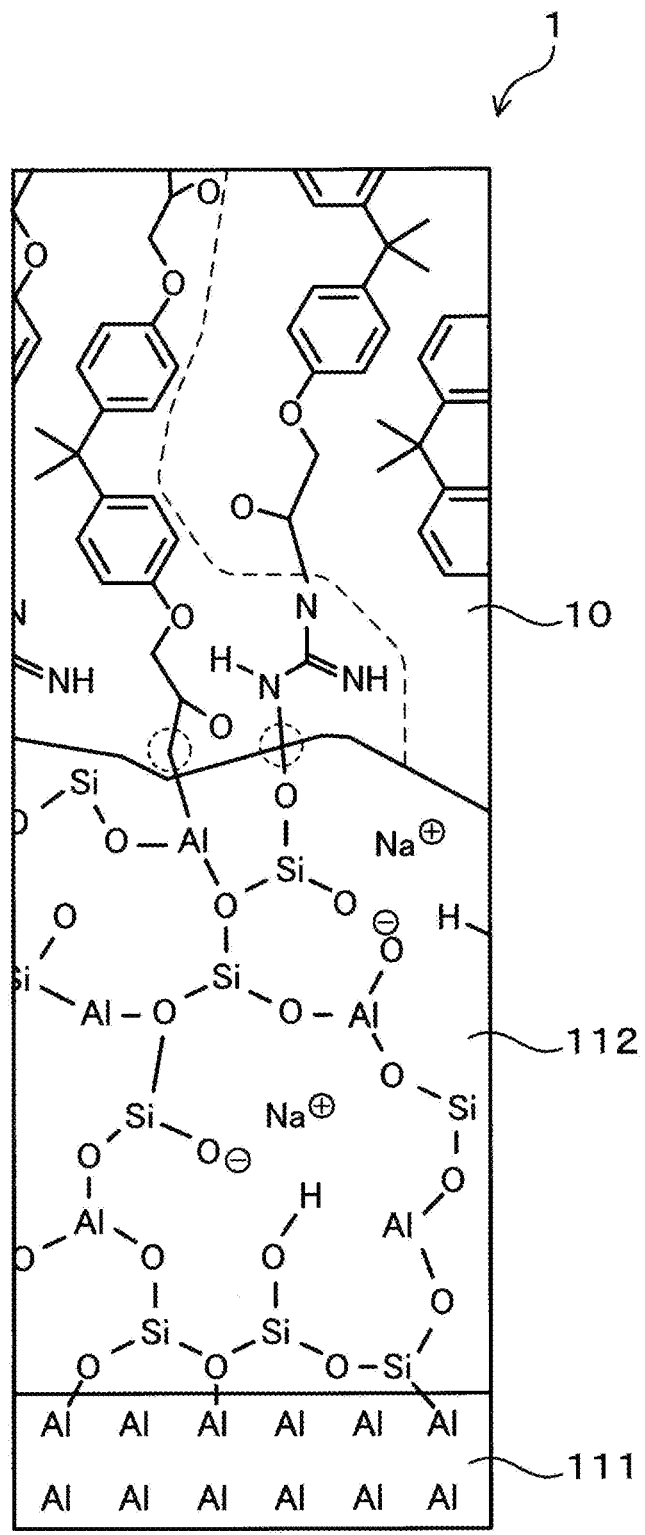
FIG. 2 is a schematic diagram illustrating an example of the chemical structure of the bonded structure according to Embodiment 1.
Figure 3:
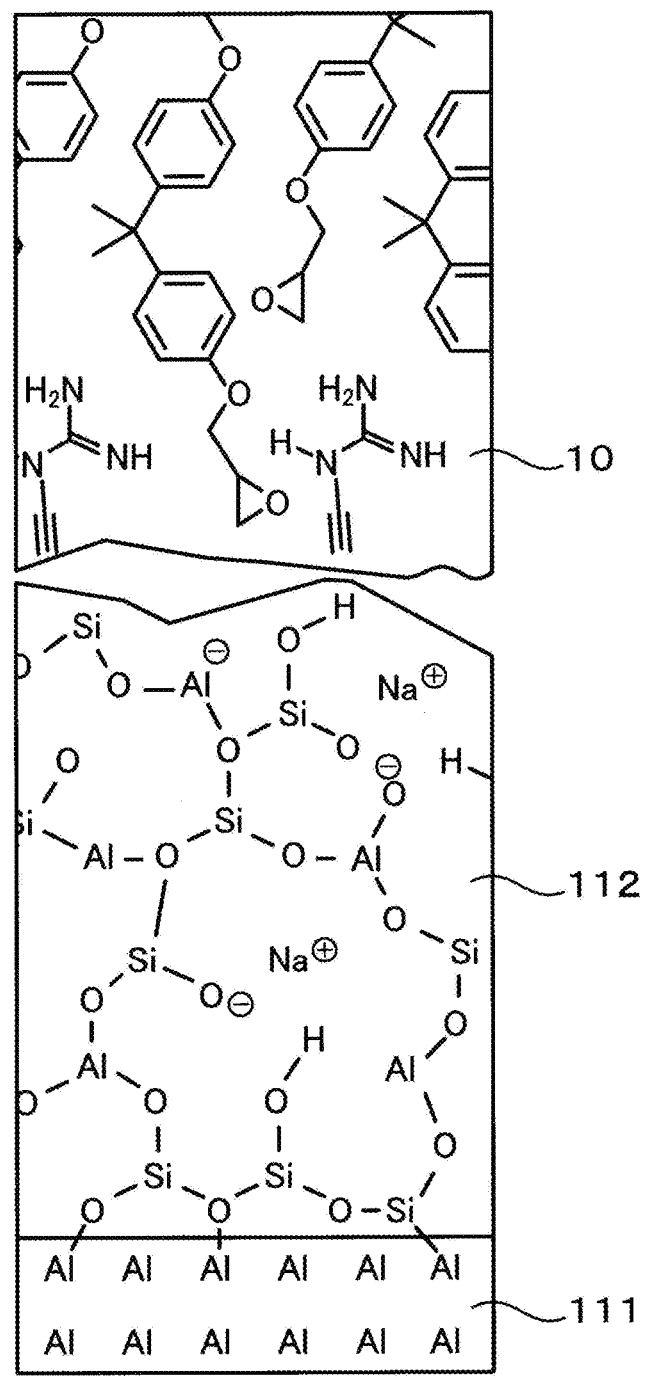
FIG. 3 is a schematic diagram illustrating an example of the chemical structure before bonding a first thin film layer and a resin adhesive layer in the bonded structure shown in FIG. 2.
Figure 4:
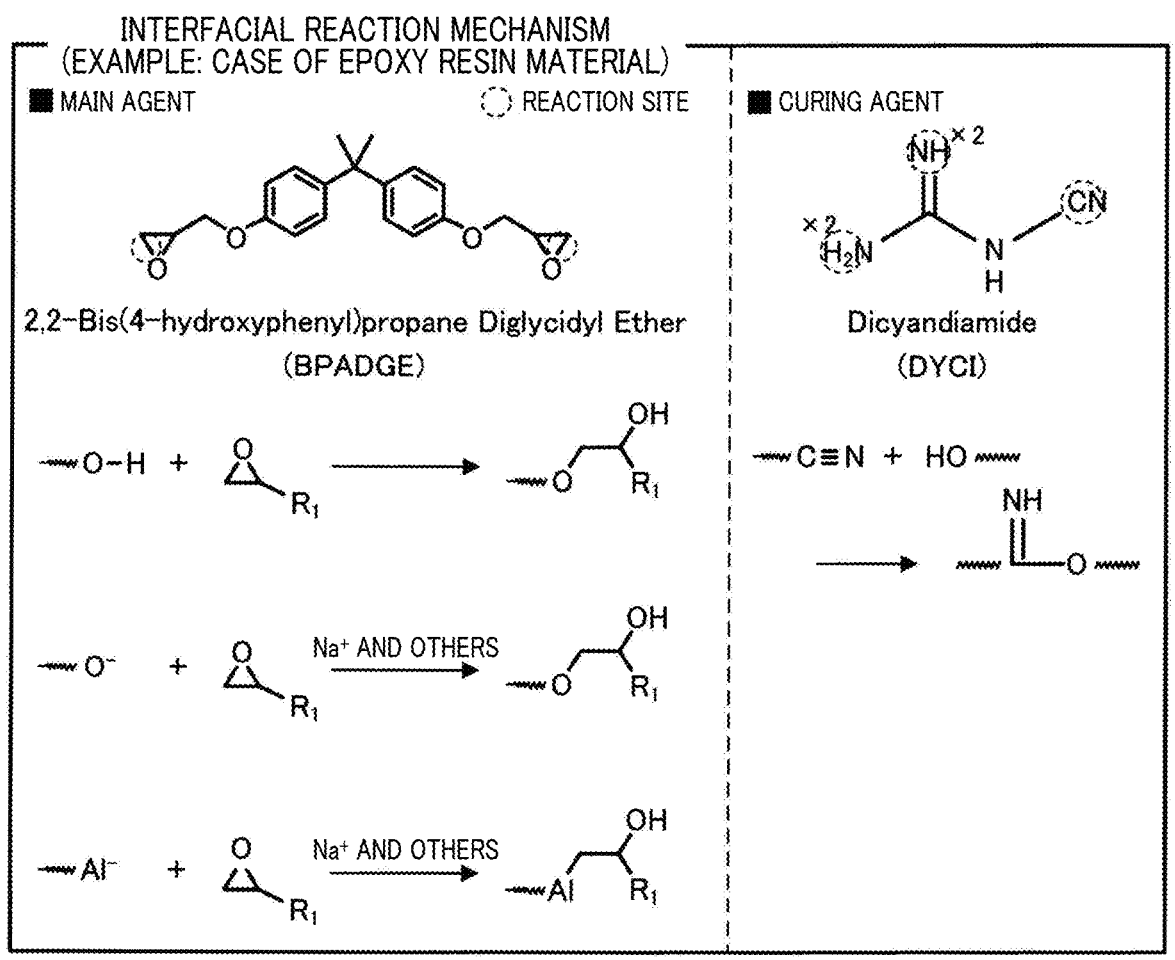
FIG. 4 is illustration diagram illustrating an example of the interfacial reaction mechanism between the first thin film layer and the resin adhesive layer.

As illustrated in FIG. 3, the aluminosilicate glass of the first thin film layer 112 has, at the surface thereof, $Al^-$ produced by the solid solution of the Al element and active sites such as $O^-$ and OH groups (Si—OH groups) before a stage before bonding the first thin film layer 112 and the resin adhesive layer 10. In addition, the epoxy resin material illustrated in FIG. 2 is composed of a cured product from the main agent (for example, 2,2-bis(4-hydroxyphenyl)propane diglycidyl ether herein, which may be referred to as BPADGE) and a curing agent (for example, dicyandiamide herein, which may be referred to as DYCI) shown in FIG. 3. The epoxy group of the epoxy resin material causes, as illustrated in FIGS. 2 and 4, an ionic reaction with $O^-$ and $Al^-$ as anionic sites in the aluminosilicate glass in bonding the first thin film layer 112 and the resin adhesive layer 10. Thus, for the bonded structure 1 illustrated in FIG. 2, the first thin film layer 112 and the resin adhesive layer 10 can be bonded by ionic bonds (circle parts of dotted lines in FIG. 2). It is to be noted that the epoxy group of the epoxy resin material is, as illustrated in FIG. 4, capable of forming covalent bonds through chemical reactions with OH groups at the aluminosilicate glass surface.

Figure 5:
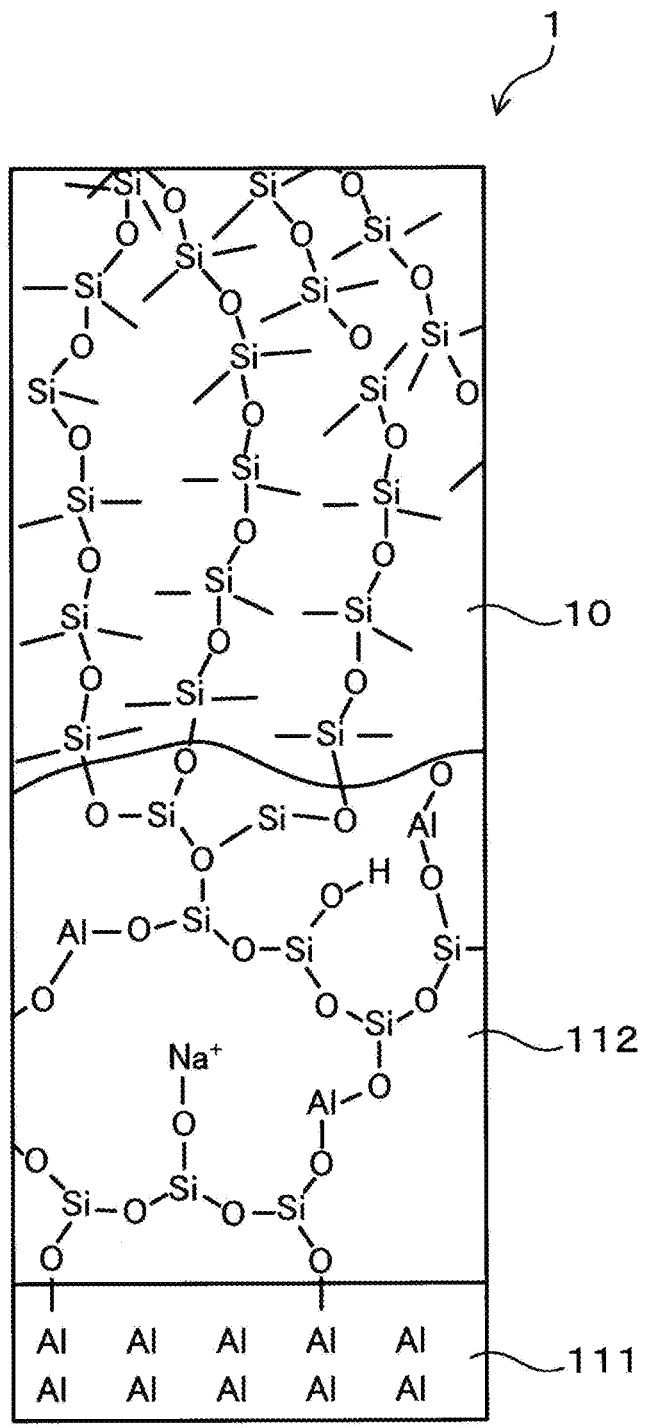
FIG. 5 is a schematic diagram illustrating another example of the chemical structure of the bonded structure according to Embodiment 1.

Next, a case where the first thin film layer 112 is composed of aluminosilicate glass that is silicate glass with the element Al present in solid solution, whereas the resin adhesive layer 10 includes a silicone resin as the resin capable of dehydration condensation will be described as an example with reference FIGS. 5 and 6.

Figure 6:
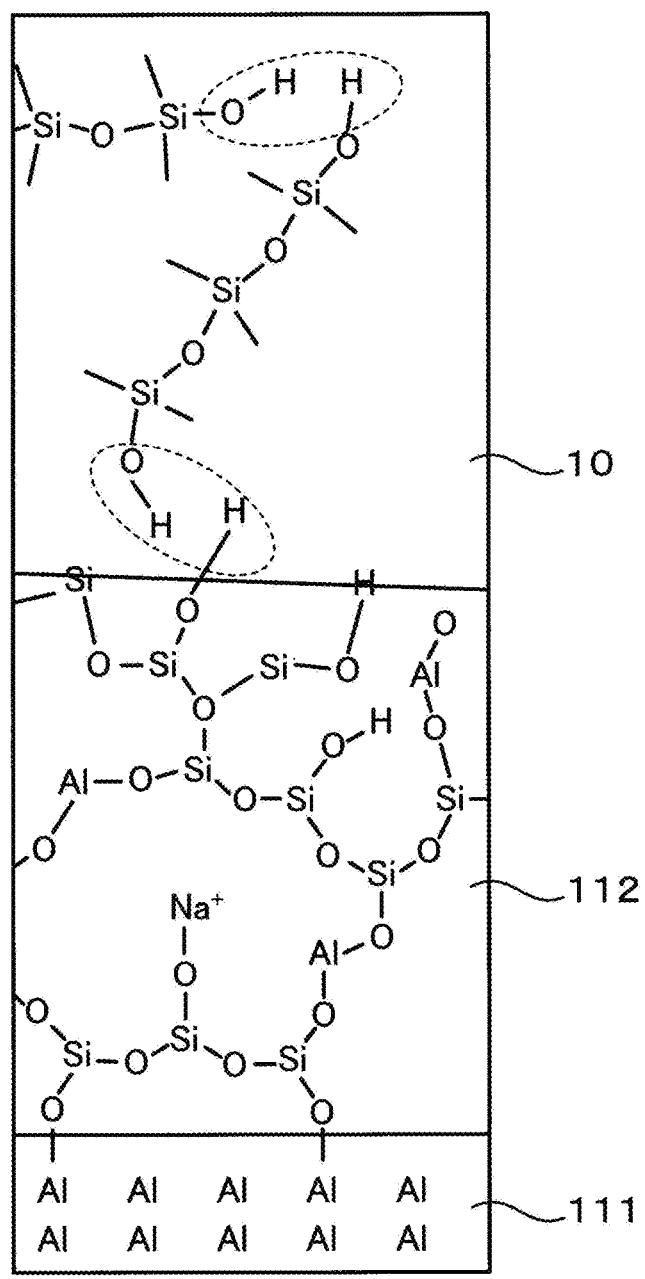
FIG. 6 is a schematic diagram illustrating an example of the chemical structure before bonding the first thin film layer and the resin adhesive layer in the bonded structure shown in FIG. 5.

As illustrated in FIG. 6, the aluminosilicate glass of the first thin film layer 112 has, at the surface thereof, OH groups (Si—OH groups) at a stage before bonding the first thin film layer 112 and the resin adhesive layer 10. In addition, the silicone resin illustrated in FIG. 5 has, at the surface thereof, OH groups (Si—OH groups) at a stage before bonding the first thin film layer 112 and the resin adhesive layer 10 as illustrated in FIG. 6. Thus, the silicone resin is, as illustrated in FIG. 5, capable of causing a dehydration condensation reaction with OH groups of the aluminosilicate glass surface in bonding the first thin film layer 112 and the resin adhesive layer 10. Thus, for the bonded structure 1 illustrated in FIG. 5, the first thin film layer 112 and the resin adhesive layer 10 can be bonded by covalent bonds.

It is to be noted that while the specific examples of the bonded structure 1 according to the present embodiment have been described with reference to FIGS. 2 to 6, the composition of the bonded structure 1 according to the present embodiment is not to be considered limited to FIGS. 2 to 6. More specifically, depending on the metal element as a solid solution in the silicate glass, the type of the resin including the structural site derived from ionic polymerization or the resin capable of dehydration condensation, included in the resin bonding layer 10, and the like, the interfacial reaction in the bonded structure can be understood in view of FIGS. 2 to 6, the other description, technical common knowledge as of filing, and the like. In addition, while the chemical-bonding state is different between the condition after the bonding and the condition before the bonding, the same symbols as those assigned to the sites in the condition after the bonding are also assigned to the sites in the condition before the bonding for the sake of convenience in FIGS. 2 and 3 and FIGS. 5 and 6.

In the bonded structure 1, the Ca content in the first thin film layer 112 can be 20% by mass or less. The Ca content is related to the OH groups present on the silicate glass surface before bonding the resin adhesive layer 10, and the quantity of the OH groups tends to decrease with an increase in Ca content, thereby decreasing the surface activity of the silicate glass before bonding the resin adhesive layer 10. The above-mentioned composition makes it easier to improve the number of active sites at the silicate glass surface before bonding the resin adhesive layer 10, thus making it easier to adequately cause the interfacial reaction between the silicate glass and the resin adhesive material and making it easier to increase the number of spots where the first thin film layer 112 and the resin adhesive layer 10 are bonded by covalent bonds. Accordingly, this composition makes it easier for the first substrate 111 and the resin adhesive layer 10 to be bonded strongly. It is to be noted that the Ca content described above is the proportion by mass of Ca to the mass of the first thin film layer 112. The Ca content can be measured by TEM-EDS (Transmission Electron Microscope-Energy Dispersive X-ray Spectroscopy).

The Ca content in the first thin film layer 112 can be preferably 15% by mass or less, more preferably 10% by mass or less, even more preferably 5% by mass or less. It is to be noted that the lower limit of the Ca content is not particularly restricted, because the Ca content is preferably lower from the perspective mentioned above. Ca is, however, an element that is likely to be mixed into silicate glass, and complete removal may be costly. Thus, Ca maybe contained as an unavoidable impurity, and may be contained at 1% by mass or more.

In the bonded structure 1, the film thickness of the first thin film layer 112 can be 2 nm or more and 25 nm or less. This composition makes it easier for the first substrate 111 and the resin adhesive layer 10 to be bonded strongly. In addition, the composition has advantages such as making it easier for the concentrations of Al and Si to be mixed in a gradient manner between the first substrate 111 and the surface of the first thin film layer 112. The film thickness of the first thin film layer 111 can be preferably 3 nm or more, more preferably 4 nm or more, even more preferably 5 nm or more, from perspectives such as making it easier to keep Al from being present excessively at the surface of the first thin film layer 112. In addition, the film thickness of the first thin film layer 111 can be preferably 23 nm or less, more preferably 20 nm or less, even more preferably 15 nm or less, from perspectives such as making the layer more likely to be cracked with an increase in thickness because the first thin film layer is relatively hard glass.

It is to be noted that the film thickness of the first thin film layer 111 is the average value for the measurement values of film thicknesses at 10 points, determined from the elemental distribution of a cross section and line analysis in the thickness direction in accordance with TEM-EDS.

In the bonded structure 1, the thickness of the resin adhesive layer 10 can be 10 nm or less. This composition has advantages such as making it easier to suppress interfacial corrosion. The thickness of the resin adhesive layer 10 can be 5 mm or less, more preferably 2 mm or less, even more preferably 1 mm or less, yet even more preferably 0.5 mm or less, from perspectives such as improving the strength of the resin adhesive layer 10. It is to be noted that the thickness of the resin adhesive layer 10 is the average value for the measurement values of thicknesses at 5 points, determined with a micrometer.

Embodiment 2

A bonded structure according to Embodiment 2 will be described with reference to FIG. 7. It is to be noted that among the reference signs used in Embodiment 2 and the subsequent embodiment, the same reference signs as those used in the already described embodiment denote the same constituent elements or the like as those in the already described embodiment, unless otherwise described.

Figure 7:
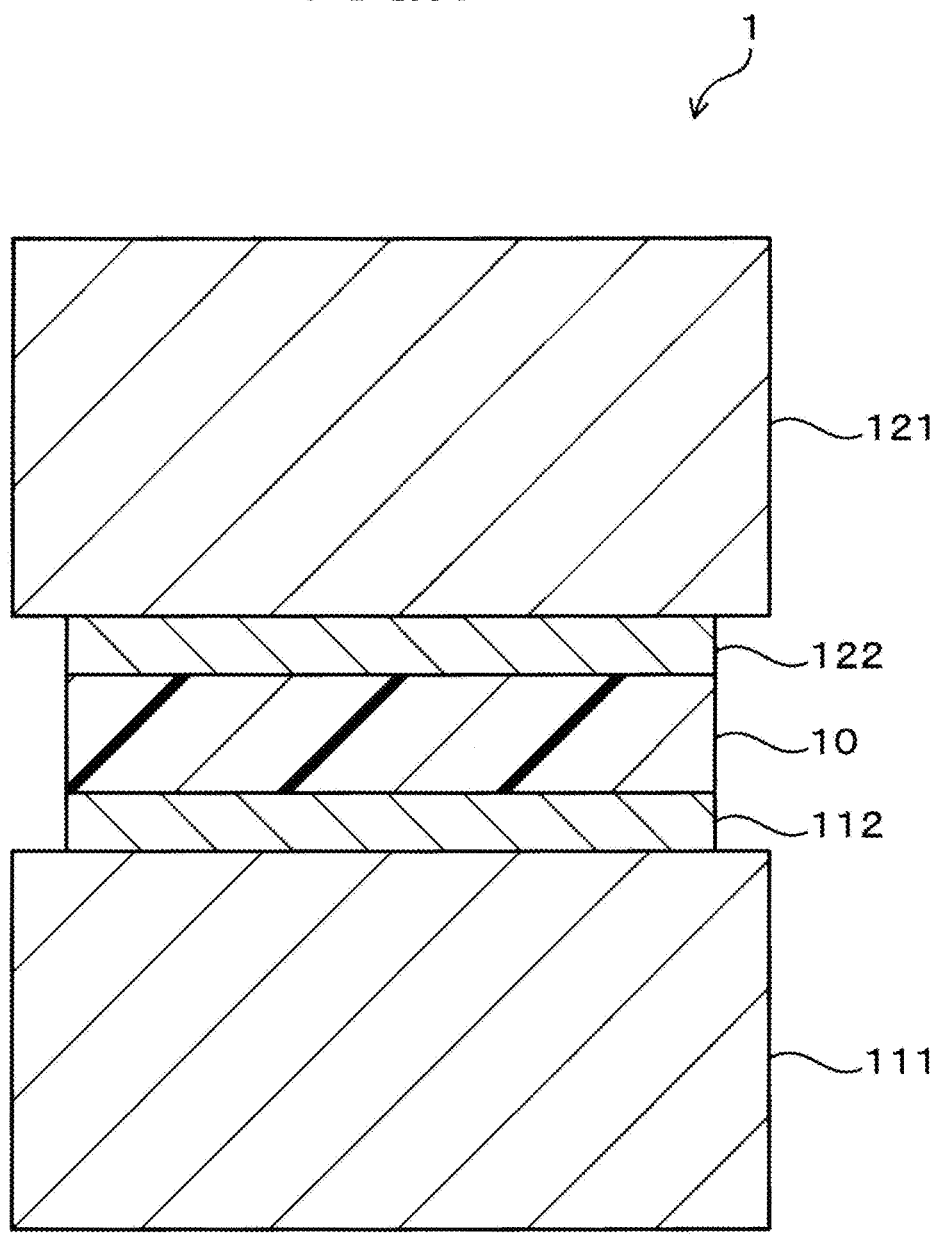
FIG. 7 is a schematic diagram illustrating a bonded structure according to Embodiment 2.

As illustrated in FIG. 7, the bonded structure 1 according to the present embodiment has a first substrate 111, a first thin film layer 112, and a resin adhesive layer 10, as with the bonded structure 1 according to Embodiment 1. The bonded structure 1 according to the present embodiment further has a second substrate 121 composed of aluminum or an aluminum alloy, and a second thin film layer 122 formed on the surface of the second substrate 121. The second thin film layer 122 is composed of the silicate glass described above, and the resin adhesive layer 10 is also bonded to the surface of the second thin film layer 122.

The second substrate 121 can be composed similarly with reference to the description of the first substrate 111 described above. The second thin film layer 122 can be composed similarly with reference to the description of the first thin film layer 112 described above. The linkage between the resin adhesive layer 10 and the second thin film layer 122 can be composed similarly with reference to the description of the above-described linkage between the adhesive resin layer 10 and the first thin film layer 112. The other composition can be also composed similarly with reference to the description of Embodiment 1. It is to be noted that the second substrate 121 may be composed of the same aluminum alloy or the like as the first substrate 111 or may be composed of a different aluminum alloy or the like therefrom in the present embodiment. In addition, the second thin film layer 122 may be composed of the same silicate glass as the first thin film layer 112 or may be composed of different silicate glass therefrom.

The bonded structure 1 according to the present embodiment allows the first substrate 111 composed of aluminum or an aluminum alloy and the second substrate 121 composed of aluminum or an aluminum alloy to be strongly bonded with the resin adhesive layer 10 interposed therebetween. The other operational effect is the same as in Embodiment 1.

In the bonded structure 1 according to the present embodiment, the thickness of the resin adhesive layer 10 can be 2 mm or less. More specifically, in the case of bonding the first substrate 111 and the second substrate 121 to each other, the thickness of the resin adhesive layer 10 formed between the first substrate 111 and the second substrate 121 can be 2 mm or less. This composition makes it easier to ensure high initial tensile shear strength between the first substrate 111 and the second substrate 121, thereby providing the bonded structure 1 with excellent strength of bonding between the first substrate 111 and the second substrate 121.

The thickness of the resin adhesive layer 10 can be preferably 1.5 mm or less, more preferably 1 mm or less, even more preferably 500 µm or less, yet even more preferably 400 µm or less, from perspectives such as making it easier to ensure the high initial tensile shear strength and enhancing the sealing property. In addition, the thickness of the resin bonding layer 10 can be preferably 1 µm or more, more preferably 5 µm or more, even more preferably 20 µm or more, from perspectives such as making it easier to relax the stress generated between the first substrate 111 and the second substrate 121 with changes in temperature. It is to be noted that the thickness of the resin adhesive layer 10 is the average value for the measurement values of thicknesses at 5 points, determined with a micrometer.

Embodiment 3

A method for producing a bonded structure according to Embodiment 3 will be described with reference to FIG. 8.

The method for producing a bonded structure according to the present embodiment (hereinafter, abbreviated as the present production method in some cases) includes a preparation step, a stacking step, and a bonding step. This will be described in detail below. It is to be noted that the present embodiment can be described with appropriate reference to the description of Embodiments 1 and 2.
<Preparation Step>

The preparation step is a step of bringing a first substrate of aluminum or an aluminum alloy with an oxide film layer of $Al_2O_3$ formed at the surface of the first substrate into contact with an alkaline silicate solution to convert the oxide film layer into a first thin film layer of silicate glass in which a metal element that has different valency from Si is present as a solid solution, thereby preparing the first substrate of aluminum or an aluminum alloy with the first thin film layer formed at the surface of the first substrate.

The silicate solution can be specifically a silicate aqueous solution. Examples of the silicate included in the silicate solution can include sodium silicates (including liquid glass, sodium metasilicates, and sodium orthosilicates). One of, or two or more of these silicates may be included. Among these silicates, the sodium silicates can be cited as preferred silicates from perspectives such as easily controlling the abundance ratio between Si and Na. It is to be noted that the various dopants mentioned above are desirably kept in small amounts, because the dopants cause a metathesis reaction in the sodium silicates.

The silicate concentration of the silicate solution can be preferably 0.1 mol/L or more, more preferably 0.2 mol/L or more, even more preferably 0.3 mol/L or more from perspectives such as ensuring the film thickness of the first thin film layer formed at the surface of the aluminum alloy or the like and removing the oxide film layer of $Al_2O_3$. In addition, the silicate concentration of the silicate solution can be preferably 1.5 mol/L or less, more preferably 1 mol/L or less, even more preferably 0.5 mol/L or less from perspectives such as possibly etching and then roughening the Al surface when the concentration is excessively increased.

The silicate solution is prepared to be alkaline from perspectives such as dissolving the oxide film layer $Al_2O_3$ and facilitating the deposition of silicate glass with an Al element present as a solid solution. Examples of the method for preparing the silicate solution to be alkaline can include a method of adding, into the silicate solution, an alkaline compound capable of releasing hydroxide ions such as a sodium hydroxide. In addition, depending on the type of the silicate used, the silicate solution may be hydrolyzed to show alkalinity.

The pH of the silicate solution can be preferably 10 or more, more preferably 11 or more, even more preferably 12 or more, from perspectives such as stabilization of the silicate solution. It is to be noted that it can be understood from the Si potential-pH equilibrium diagram that the pH of 10 or more, desirably 11 or more makes the silicate solution more likely to be stabilized. In addition, the pH of the silicate solution can be preferably 14 or less, more preferably 13.5 or less, even more preferably 13 or less, from perspectives such as facilitating the solid solution of Al into silicate glass deposited, keeping the deposited silicate glass from being dissolved, and making it easier to ensure the film thickness.

The temperature of the silicate solution can be preferably 35° C. or higher, more preferably 40° C. or higher, even more preferably 50° C. or higher, from perspectives such as facilitating the deposition of sufficient silicate glass. In addition, the temperature of the silicate solution can be preferably 90° C. or lower, more preferably 70° C. or lower, even more preferably 60° C. or higher, from perspectives such as improving the handleability of the silicate solution and the safety in the production of the bonded structure.

Examples of the method for bringing the first substrate with the oxide film layer formed into contact with the silicate solution can include a method of immersing the whole first substrate with the oxide film layer formed in the silicate solution, a method of immersing the oxide film layer of the first substrate in the silicate solution, and a method of spraying the silicate solution to the oxide film layer. Preferably, the method of immersing the whole first substrate with the oxide film layer formed in the silicate solution can be employed from perspectives such as relative simplicity, and the formability and quality of the thin film layer. Further, before bringing the first substrate with the oxide film layer formed into contact with the silicate solution, the surface of the first substrate can be subjected to a degreasing treatment, if necessary. In addition, before bringing the first substrate with the oxide film layer formed into contact with the silicate solution, the surface of the first substrate can be subjected to an alkaline treatment such that the surface is not excessively roughened, if necessary.

The time of contact with the silicate solution can be 15 seconds or longer, more specifically 30 seconds or longer, even more preferably 1 minute or longer, from perspectives such as facilitating the deposition of sufficient silicate glass, and improving the bonding strength, e.g., with improved performance of removing the oxide film layer. In addition, the temperature of the silicate solution can be preferably 1 hour or shorter, more preferably 30 minutes or shorter, even more preferably 10 minutes or shorter, yet even more preferably 3 minutes or shorter, from perspectives such as improving the handleability of the silicate solution and the safety in the production of the bonded structure.

In the preparing step, when the oxide film layer of $Al_2O_3$ comes into contact with the alkaline silicate solution, the $Al_2O_3$ is dissolved in the silicate solution to remove the oxide film layer, and the first thin film layer of silicate glass with an Al element as a solid solution is formed on the surface of the aluminum alloy or the like. More specifically, the oxide film layer of $Al_2O_3$ is converted to the first thin film layer of silicate glass with an Al element present as a solid solution. This conversion may be referred to as a metathesis reaction. It is to be noted that the Al constituting the first substrate may be partially dissolved in the silicate solution, and present as a solid solution in the silicate glass. In addition, in the case of making other elements present as a solid solution in the silicate glass, for example, salts containing predetermined metal elements may be added into the silicate solution used.

The preparation step described above will be specifically described with reference to FIG. 8. It is to be noted that an example of silicate treatment with the use of, as the alkaline silicate solution, a sodium silicate aqueous solution (silicate soda solution) with pH approximately from 10 to 14 will be provided herein, but the preparation step is not to be considered limited thereto.

As shown in FIG. 8(a), a first substrate 111 of aluminum or an aluminum alloy with an oxide film layer 111a of $Al_2O_3$ formed at the surface is prepared. The surface of the oxide film layer 111a can be subjected to a degreasing treatment. Then, as shown in FIG. 8(b), the first substrate 111 is immersed in an alkaline silicate solution 2. $HSiO_3^-$ and $Na^+$ derived from sodium silicate are present in the silicate solution 2. The immersion mentioned above causes the $Al_2O_3$ to dissolve out, thereby producing $Al(OH)_4$ and $H^+$ in the silicate solution 2. Then, as shown in FIG. 8(c), a silicate (aluminosilicate) 112a with an Al element present as a solid solution is deposited from $HSiO_3^-$, $H^+$, and $Al(OH)_4$. It is to be noted that in practice, the silicate 112a growing excessively is dissolved, while the dissolution reaction of $Al_2O_3$ and the deposition reaction of the silicate 112a are repeated. Thus, the dissolution rate of the silicate 112a is equal to the deposition rate of the silicate 112a, and the silicate 112a will thus not be formed as an excessively thick film. Then, finally, the $Al_2O_3$ of the oxide film layer 111a is replaced with the silicate (aluminosilicate) 112a. Thus, a first thin film layer 112 is formed on the first substrate 111 of aluminum or an aluminum alloy. It is to be noted that the silicate treatment with the sodium silicate aqueous solution may cause the Na component such as NaOH to adhere as a residue to the surface of the silicate film. In addition, after the immersion mentioned above, the first substrate 111 with the first thin film layer 112 formed is separated from the silicate solution 2, and cleaned, if necessary.

<Stacking Step>

The stacking step is a step of obtaining a stacked body where the first thin film layer at the first substrate and a resin adhesive material layer formed from a resin adhesive material that is subjected to curing to serve as the resin including the structural site derived from ionic polymerization or the resin capable of dehydration condensation are stacked in order. According to the present embodiment, the stacked body has a stacked structure where the first substrate, the first thin film layer, and the resin adhesive material layer are stacked in order.

Examples of the resin adhesive material is subjected to curing to serve as the resin including the structural site derived from ionic polymerization can include uncured epoxy resin materials and polyurethane resin materials. The uncured epoxy resin material can include a main agent and a curing agent. In addition, examples of the resin adhesive material that is subjected to curing to serve as the resin capable of dehydration condensation can include uncured silicone resin materials and polyester resin materials.

The stacked body can be specifically prepared by, for example, forming the resin adhesive material into the form of a layer on the surface of the first thin film layer at the first substrate, e.g., applying the material to the surface.

<Bonding Step>

The bonding step is a step of heating the stacked body to cause a chemical reaction at the interface between the first thin film layer and the resin adhesive material layer, and then further raising the heating temperature to cure the resin adhesive material layer, thereby forming a resin adhesive layer bonded to the surface of the first thin film layer.

In the case where the resin adhesive material is an epoxy resin material, the stacked body can be heated. Specifically, the temperature of the stacked body is raised by heating, and the stacked body is maintained for a predetermined period of time preferably in the temperature range of 135° C. or higher and 145° C. or lower to cause a chemical reaction (in this example, at least an ionic reaction) at the interface between the first thin film layer and the resin adhesive material layer. In this regard, the temperature of 135° C. or higher is preferred because of reasons such as a ensuring the chemical reaction at the interface between the first thin film layer and the resin adhesive material layer. In addition, the temperature of 145° C. or lower is preferred because of reasons such as making the curing reaction of the epoxy resin material more likely to be caused at temperatures in excess of 145° C. Thereafter, the temperature of the stacked body is further raised by heating, and the stacked body is maintained for a predetermined period of time preferably in the temperature range in excess of 145° C. and equal to or lower than 160° C. to make the resin adhesive material layer cured (cross-linked in this example), and then form a resin adhesive layer bonded to the surface of the first thin film layer. In this regard, the temperature of 160° C. or lower is preferred because outgassing more likely to occur at temperatures in excess of 160° C. It is to be noted that after the stacked body is maintained for a predetermined period of time to cure the resin adhesive material layer, the stacked body may be left to cool naturally or be forced to be cooled.

In the case where the resin adhesive material is a silicone resin material, specifically, although not shown, the temperature of the stacked body may be raised by heating, and the stacked body may be maintained for a predetermined period of time preferably in the temperature range of 130° C. or higher and 140° C. or lower to cause a chemical reaction (in this example, a dehydration condensation reaction (silanol reaction)) at the interface between the first thin film layer and the resin adhesive material layer, and thereafter, the temperature of the stacked body may be further raised by heating, and the stacked body may be maintained for a predetermined period of time preferably in the temperature range in excess of 140° C. and equal to or lower than 180° C. to make the resin adhesive material layer cured, and then form a resin adhesive layer bonded to the surface of the first thin film layer.

The present production method has the steps mentioned above. Thus, the method is capable of producing a bonded structure where the first substrate composed of aluminum or an aluminum alloy and the resin adhesive layer are bonded strongly. In addition, in ordinary circumstances, aluminum or an aluminum alloy has, even after removing the oxide film layer thereof, another oxide film layer formed immediately, and the adequate removal of the oxide film layer is thus difficult. In the preparation step mentioned above, the removal of the oxide film layer and the production of the first thin film layer are achieved simultaneously, thus making the oxide film layer less likely to be left between the first substrate and the first thin film layer. Accordingly, the present production method is capable of ensuring the chemical bond between the first substrate and the first thin film layer. Furthermore, according to the bonding step mentioned above, the chemical reaction is caused at the interface between the first thin film layer and the resin adhesive material layer at a temperature that is lower than the curing temperature of the resin adhesive material. Accordingly, the present production method is capable of suppressing thermal degradation due to the overheated resin adhesive layer.

It is to be noted that the respective steps of the present production method can be modified as follows in the case of producing a bonded structure further including the second thin film layer and second substrate described in Embodiment 2.

In the preparation step described above, the second substrate of aluminum or an aluminum alloy with the second thin film layer formed at the surface of the second substrate is further prepared in the same manner as mentioned above.

In the stacking step described above, a stacked body where the first thin film layer at the first substrate, the resin adhesive material layer, and furthermore, the second thin film layer at the second substrate are stacked in order is prepared. More specifically, in this case, the stacked body has a stacked structure where the first substrate, the first thin film layer, the resin adhesive material layer, the second thin film layer, and the second substrate are stacked in order.

The stacked body can be specifically prepared by, for example, disposing the first substrate and the second substrate such that the surface of the first thin film layer and the surface of the second thin film layer are opposed to each other at a distance, and filling the space formed between the surface of the first thin film layer and the surface of the second thin film layer with the resin adhesive material to form the resin adhesive material layer. This method makes it easier to make the resin adhesive layer formed tinner in a relatively uniform manner. Further, examples of the method for filling the narrow space with the resin adhesive material can include a method of disposing the resin adhesive material in contact with an end face of the space (an inlet of the space), and reducing the viscosity of the resin adhesive material by heating to cause the material flow and fill the space. In this regard, the heating for the filling mentioned above may be carried out at a temperature at which the resin adhesive material will not react.

Alternatively, for example, the stacked body can be also prepared by applying the resin adhesive material in the form of a layer onto the surface of the first thin film layer at the first substrate and/or the surface of the second thin film layer at the second substrate, and bonding the both surfaces to each other.

In the bonding step described above, the stacked body is heated to cause a chemical reaction at the interface between the first thin film layer and the resin adhesive material and the interface between the second thin film layer and the resin adhesive material, and then, the heating temperature is further raised to make the uncured resin adhesive material layer cured, and form a resin adhesive layer bonded to the surface of the first thin film layer and the second thin film layer.

EXPERIMENTAL EXAMPLES

Experimental Example 1

After an aluminum substrate with an oxide film layer, in the shape with length l=40 mm, width w=10 mm, and thickness t=1 mm, was subjected to alkali cleaning, this substrate was immersed for 1 minute in a sodium silicate aqueous solution with pH 12.4, a liquid temperature of 50° C., and a sodium silicate concentration of 0.4 mol/L and then cleaned with pure water. Thus, an aluminum substrate was prepared where the oxide film layer of $Al_2O_3$ was replaced with a thin film layer (film thickness: 7 nm) of silicate glass with an Al element as a solid solution. It is to be noted that details of the film structure of the thin film layer will be described in detail in Experimental Example 2 and Experimental Example 3.

Next, as shown in FIG. 9(a), two aluminum substrates prepared as mentioned above were disposed so as to have an overlap over the range of 10 nm in length with a gap formed between the substrate surfaces at respective ends. It is to be noted that the gap distance was adjusted to 0.2 mm. Then, a resin adhesive material was applied to an end of the gap mentioned above (a part A in the figure). For the resin adhesive material, an epoxy resin material was used which was composed of 2,2-bis(4-hydroxyphenyl)propanediglycidyl ether (BPADGE) as a main agent and dicyandiamide (DYCI) as a curing agent. Then, heating to 80° C. decreased the viscosity of the resin adhesive material to cause the material to flow and then fill the gap mentioned above. Thus, obtained was a stacked body with a stacked structure of aluminum substrate/thin film layer/resin adhesive material layer/thin film layer/aluminum substrate stacked in this order.

Next, the stacked body obtained was heated, maintained at 135° C. for 10 minutes, then maintained at 155° C. for 20 minutes after further raining the heating temperature, and then naturally cooled. Thus, prepared was a test piece 1-1 in the form shown in FIG. 9(a), including a thin film layer of silicate glass with an Al as a solid solution, formed at the surface of one of the aluminum substrates, a thin film layer of silicate glass with an Al as a solid solution, formed at the surface of the other aluminum substrate, and a resin adhesive layer bonded to the both thin film layers.

In the same manner except that the aluminum substrate with the oxide film layer was directly used without carrying out the treatment of immersion in the sodium silicate aqueous solution in the preparation of the test piece mentioned above, a test piece 1-1C for comparison was prepared.

The tensile shear strength was measured with the use of each test piece. For the measurement, a universal testing machine ("AUTOGRAPH" from Shimadzu Corporation) was used. The measurement conditions were tension rate: 5 mm/min, gripping width: 10 mm, and the number of measurements=4. The results are shown in FIG. 9(b) as results of evaluating the bonding strength.

As shown in FIG. 9(b), the test piece 1-1 prepared with the silicate treatment of the aluminum substrate surface with the oxide film layer exhibited high initial tensile shear strength, as compared with the test piece 1-1C prepared without the silicate treatment of the aluminum substrate surface with the oxide film layer. This is believed to be because the formation of ionic bonds at the interface between the thin film layer of silicate glass formed at the aluminum substrate surface and the resin adhesive layer, and the formation of chemical bonds such as an Al—Si bond and an Al—O bond at the interface between the aluminum substrate and the thin film layer in the test piece 1-1.

Experimental Example 2

The following experiment was carried out for checking the composition of a thin film layer formed by silicate treatment of aluminum with an oxide film layer formed at the surface of the aluminum.

On the surface of a Si wafer, an Al film was deposited. It is to be noted that the surface of the Al film has an oxide film naturally formed. The Si wafer with the Al deposited film formed was subjected to alkali cleaning, immersed for 1 minute in a sodium silicate aqueous solution with pH 12.4, a liquid temperature of 50° C., and a sodium silicate concentration of 0.4 mol/L, and then cleaned with pure water. Thus, prepared was a sample 2-1 with a thin film layer formed at the surface of the Al deposited film. The obtained sample 2-1 was subjected to cross-section analysis, and line analysis in the thickness direction by TEM-EDS (Transmission Electron Microscope-Energy Dispersive X-ray Spectroscopy). It is to be noted that a protective film composed of a carbon-deposited film was formed on the surface of the thin film layer. The results are shown in FIGS. 10 and 11.

Figure 10:
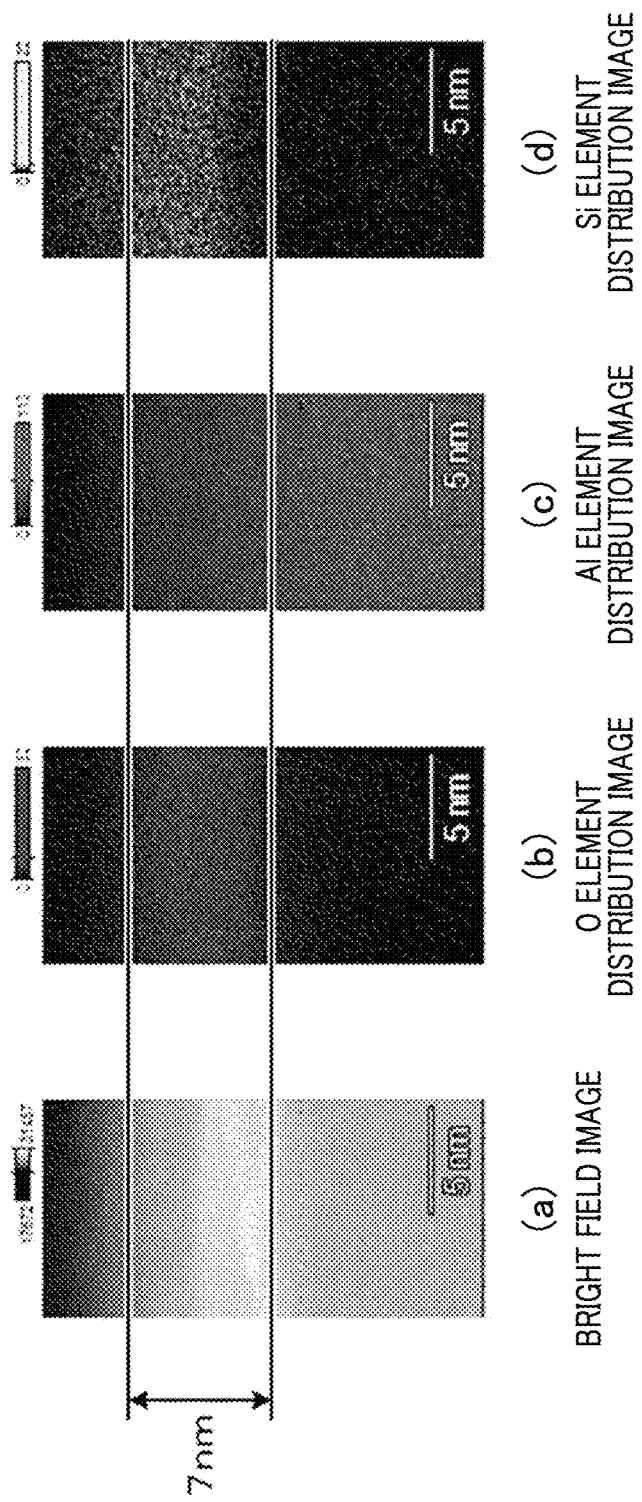
FIG. 10 shows results of cross-section analysis of a sample 2-1 by TEM-EDS (Transmission Electron Microscope-Energy Dispersive X-ray Spectroscopy) in Experimental Example 2, where FIG. 10($a$) is a bright-field image, FIG. 10($b$) is an O element distribution image, FIG. 10($c$) is an Al element distribution image, and FIG. 10($d$) is a Si element distribution image.

The results of the cross-section analysis of the sample 2-1 in accordance with TEM-EDS, shown in FIG. 10, determines that the thin film layer is formed between the Al deposited film and the protective film, as shown in FIG. 10(a). In addition, it is determined that the thin film layer contains an O element, an Al element, and a Si element, as shown in FIGS. 10(b) to 10(d). From the results, the thin film layer can be considered composed of a silicate glass with an Al element as a solid solution.

In addition, the Al element present in the silicate glass as a solid solution can be considered derived from $Al^{3+}$ dissolved from $Al_2O_3$ of the Al-deposited film surface into the silicate aqueous solution. Further, the element derived from $Al^{3+}$ dissolved from the Al film is believed to be also partially contained. Accordingly, the presence of ions of a metal element that has different valency from Si in the silicate solution can be also considered to allow a solid solution of a metal element that is different from the Al element during the deposition of silicate glass.

Figure 11:
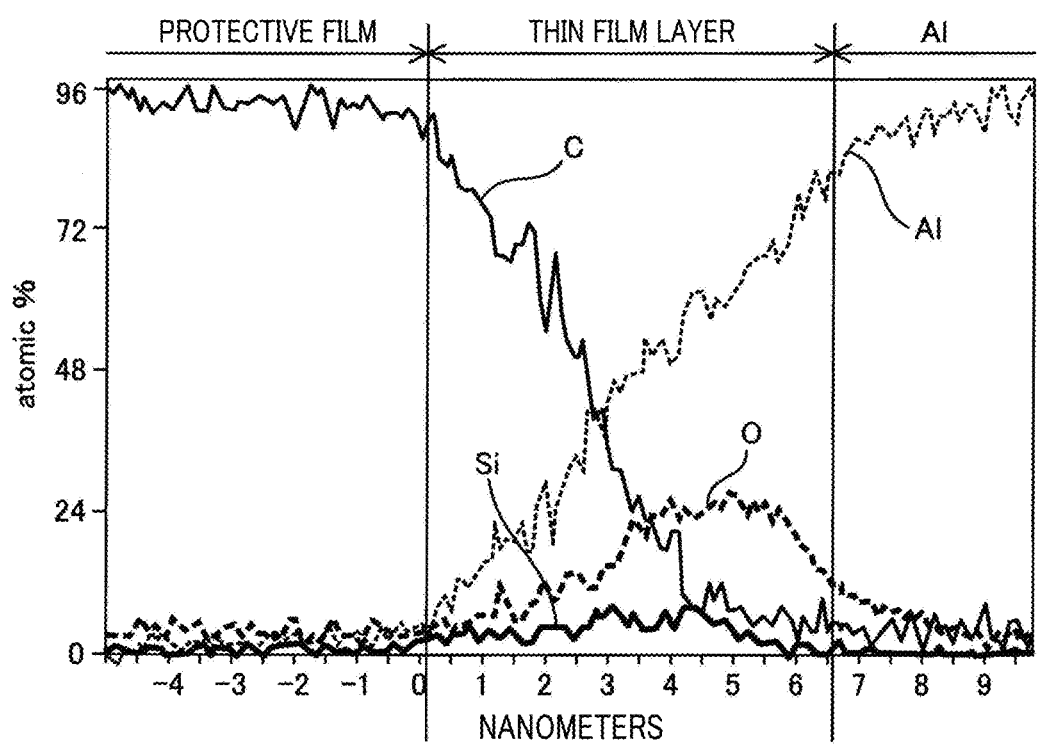
FIG. 11 is a diagram showing the result of line analysis of the sample 2-1 in the thickness direction by TEM-EDS in Experimental Example 2.

Furthermore, the result of the line analysis of the sample 2-1 in the thickness direction in accordance with TEM-EDS, shown in FIG. 11 has demonstrated that the thin film layer is about 7 nm in thickness from the concentration distribution of each element constituting the thin film layer.

Experimental Example 3

The following experiment was carried out for checking active sites at the surface of a silicate glass film in which a metal element with different valency from Si was present as a solid solution.

In the same manner as in the preparation of the sample 2-1 in Experimental Example 2, a sample 3-1 was prepared. In addition, in the same manner except that the silicate treatment was not carried out in the preparation of the sample 2-1 in Experimental Example 2, a sample 3-1C was prepared.

Each of the samples was subjected to surface activity analysis with the use of a scanning probe microscope (SPM) with a surface-modified probe. It is to be noted that a probe surface-coated with $HSCH_2(CH_2)_3CH_2$ with a spring constant of 0.35 N/m was used for the surface-modified probe. This surface-modified probe has a high affinity for an OH group. Thus, the adsorption force of OH groups at the surface of the object to be measured can be determined by the surface activity analysis with the scanning probe microscope with the use of the surface-modified probe. More OH groups can be considered present at the surface of the object to be measured as the adsorption force is increased. It is determined that the surface (thin film layer surface) of the sample 2-1 subjected to the silicate treatment, shown in FIG. 12(b), shows high adsorption force with respect to the surface (oxide film layer surface) of the sample 2-1C subjected to no silicate treatment, as shown in FIG. 12(a). It is to be noted that the average adsorption force of the surface of the sample 2-1C was 0.47 nN in this example. In addition, the average adsorption force of the surface of the sample 2-1 was 2.29 nN. From the results, it has been confirmed that active OH groups are present at the surface of the silicate glass with an Al element as a solid solution. It is to be noted that $Al^-$ and $O^-$ are produced by the solid solution of the Al element with different valency from Si in the silicate glass. These ions are also capable of causing an ionic reaction as ionic active sites as with the OH groups.

In addition, as shown in FIG. 12(b), a region with lower adsorption force (part B in the figure) as compared with the region with higher adsorption force was observed at the surface of the silicate glass with the Al element as a solid solution. The element present in the lower adsorption force region was examined by TEM-EDS, thereby resulting in a Ca element observed. It is to be noted that the Ca component is considered contained in the raw material used for the silicate treatment used in the present example. From the result mentioned above, the Ca element excessively in the silicate glass as a solid solution may possibly generate a lot of regions without OH groups or with OH groups deactivated, thereby decreasing the strength of bonding to the resin adhesive layer. From perspectives such as making it easier to improve the number of active sites at the silicate glass surface before bonding the resin adhesive layer, the Ca content in the thin film layer may be preferably 20% by mass or less.

Experimental Example 4

The following experiment was carried out for examining the interfacial reaction mechanism between the thin film layer and the resin adhesive layer.

On the surface of an Al-deposited film on a Si wafer surface, a thin film layer was formed by the same silicate treatment as in the preparation of the sample 2-1 in Experimental Example 2. BPADGE as a main agent for the epoxy resin material described above was applied onto the surface of the thin film layer, maintained at 135° C. for 10 minutes, then heated under the heating condition of maintaining at 155° C. for 20 minutes, and then cleaned with tetrahydrofuran (THF). Thus, a sample 4-1 (thin film layer/BPADGE) was obtained. In addition, DYCI as a curing agent for the epoxy resin material described above was applied onto the surface of a thin film layer, maintained at 135° C. for 10 minutes, then heated under the heating condition of maintaining at 155° C. for 20 minutes, and then cleaned with tetrahydrofuran (THF). Thus, a sample 4-2 (thin film layer/DYCI) was obtained. Furthermore, a thin film layer only formed on the surface of an Al-deposited film on a Si wafer surface was employed as a sample 4-3 (thin film layer).

In the same manner as with the sample 4-1 except that BPADGE was applied to an Al-deposited film on a Si wafer surface, a sample 4-4 (Al/BPADGE) was obtained. In addition, in the same manner as with the sample 4-2 except that DYCI was applied to an Al-deposited film on a Si wafer surface, a sample 4-5 (Al/DYCI) was obtained. Furthermore, an Al-deposited film only formed on a Si wafer surface was employed as a sample 4-6 (Al).

Figure 13:
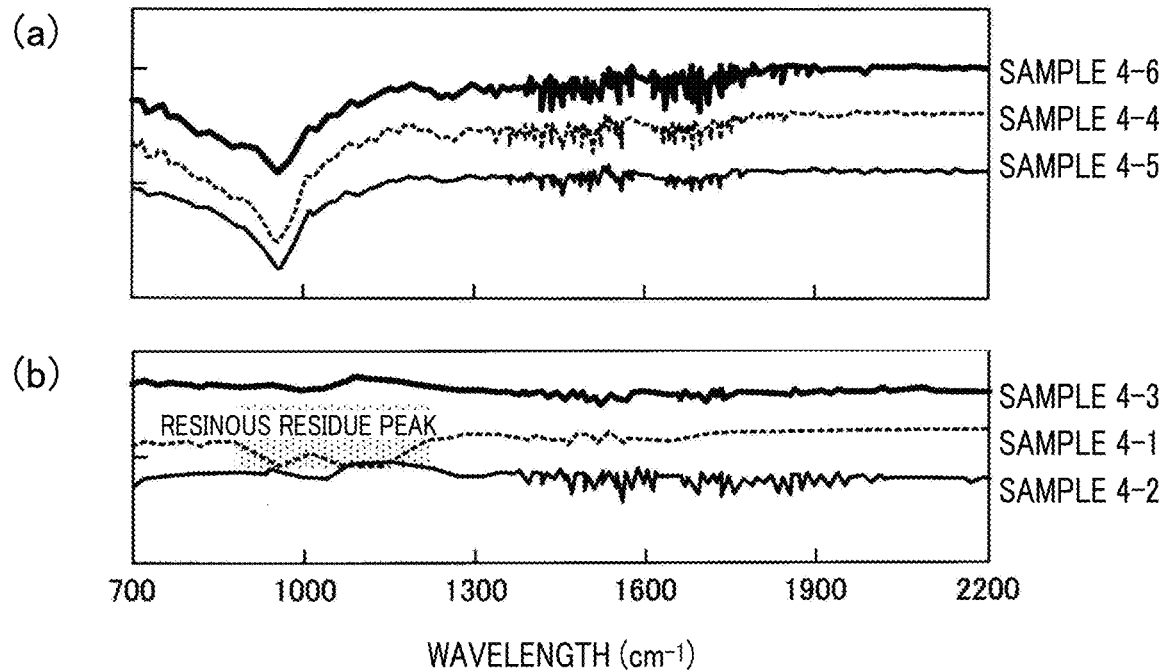
FIG. 13 shows FT-IR spectra obtained by an ATR method in Experimental Example 4, where FIG. 13($a$) shows spectra in the case of using Al without any thin film layer obtained by silicate treatment at the surface, and FIG. 13($b$) shows spectra in the case of using Al with a thin film layer obtained by silicate treatment at the surface.

For each sample, an FT-IR spectrum was measured by FT-IR measurement in accordance with an ATR method. The results are shown in FIG. 13.

As shown in FIG. 13(b), the comparison among the FT-IR spectra of the sample 4-1 (thin film layer/BPADGE), sample 4-2 (thin film layer/DYCI), and sample 4-3 (thin film layer) has found that the FT-IR spectrum of the sample 4-1 (thin film layer/BPADGE) has a resinous residue peak at a wavenumber around 1000 cm$^{-1}$. In consideration of the surface condition of the silicate glass in Experimental Example 3, from the result, the main agent of the epoxy resin material and the thin film layer are believed to react mainly as shown in FIG. 4 in the case where the epoxy resin material is used as the resin adhesive layer material. Specifically, the main agent of the epoxy resin material includes therein epoxy groups as functional groups that react with active sites such as $Al^-$, $O^-$, and OH groups at the first thin film layer surface. Thus, the epoxy groups of the main agent cause ionic reactions with $Al^-$ and $O^-$ at first thin film layer surface, thereby forming ionic bonds. In addition, the epoxy groups cause chemical reactions with OH groups at the first thin film layer surface, thereby forming covalent bonds.

Experimental Example 5

Figure 14:
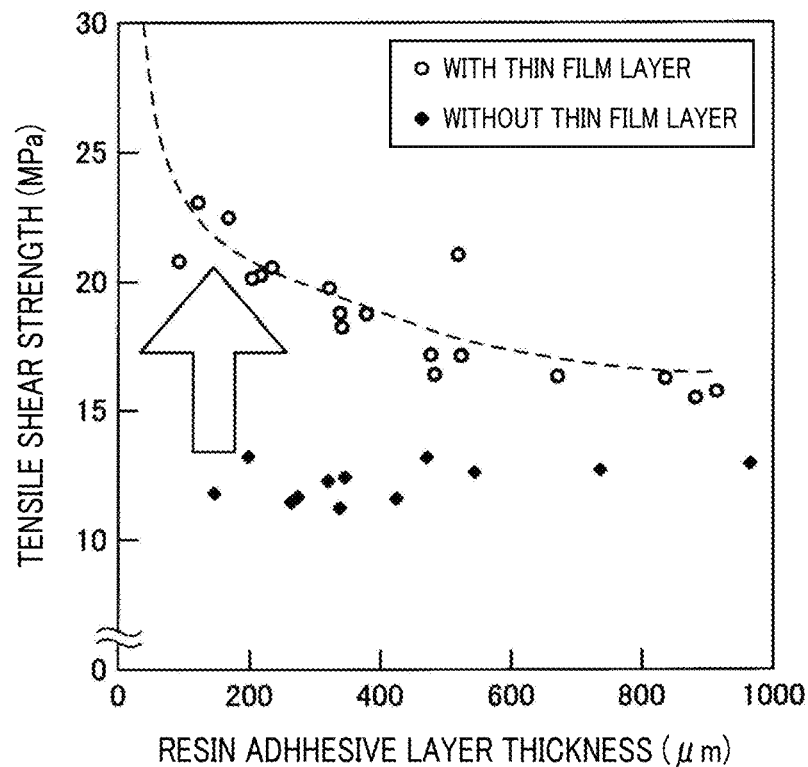
FIG. 14 is a diagram showing the relation between the thickness of a resin adhesive layer and initial tensile shear strength in Experimental Example 5.

In the same manner as in Experimental Example 1, the size of the gap between substrate surfaces of two aluminum substrates was varied in the case of having a thin film layer and in the case of having no thin film layer, thereby preparing multiple samples different in the thickness of the resin adhesive layer, and the relation between the thickness of the resin adhesive layer and the initial tensile shear strength was determined. The results are shown in FIG. 14. As shown in FIG. 14, it is determined that the tensile shear strength in the sample with the thin film layer formed is greater than the initial tensile shear strength in the sample without the thin film layer formed. Although the thickness of the resin adhesive layer between the aluminum substrates is 1000 μm (=1 mm) or less in FIG. 14, a similar tendency was observed even in the case where the thickness of the resin adhesive layer between the aluminum substrates was 2 mm or less. Further, although not shown, when the tensile shear strength was measured after evaluating the samples for durability under the condition of 1000 h at 85° C. and humidity of 85%, the tensile shear strength after the durability in the sample with the thin film layer formed was greater than the tensile shear strength after the durability in the sample without the thin film layer formed in the case where the thickness of the resin adhesive layer between the aluminum substrates was 10 mm or less.

In addition, according to FIG. 14, it is determined that the initial tensile shear strength has a tendency to be increased as the thickness of the resin adhesive layer between the aluminum substrates is 1000 μm or less. It is determined that in particular, as the thickness of the resin adhesive layer between the aluminum substrates is 400 μm or less, the effect of improving the initial tensile shear strength is enhanced.

Experimental Example 6

Figure 15:
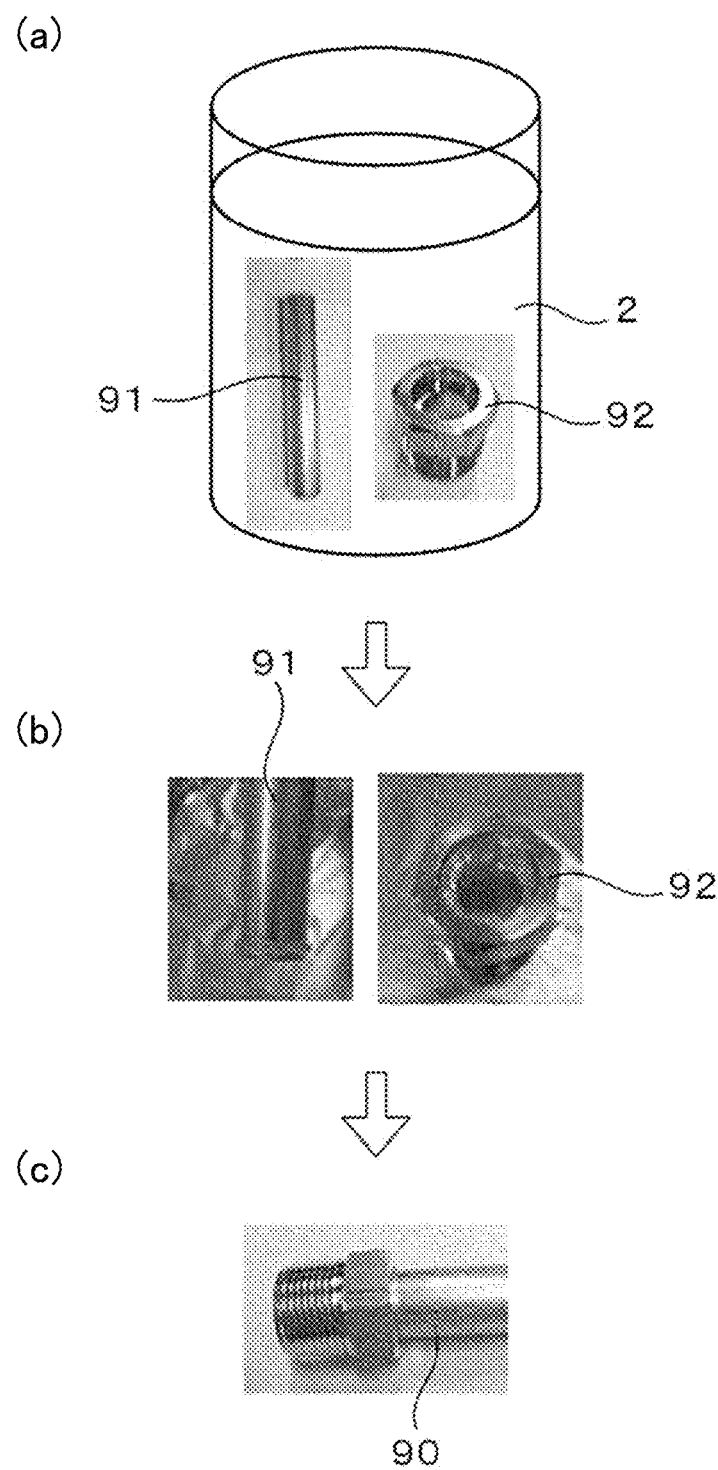
FIG. 15 is a diagram illustrating a procedure for preparing a coupling pipe sample in Experimental example 6.

Evaluated was a case in which a bonded structure according to the present disclosure was applied to joining between a pipe made of an aluminum alloy and a coupling member for piping. Specifically prepared were a pipe 91 of an A3003 aluminum alloy and a coupling member 91 of an A3003 aluminum alloy in the shapes shown in FIG. 15. It is to be noted that the prepared pipe 91 and coupling member 92 have been subjected to a degreasing treatment.

Then, as shown in FIG. 15(a), the pipe and the coupling member were immersed for 1 minute in a sodium silicate aqueous solution 2 with predetermined pH, a liquid temperature of 70° C., and a sodium silicate concentration of 0.2 mol/L. It is to be noted that the pH of the sodium silicate aqueous solution 2 was adjusted to fall within the range of 10 or more and 14 or less. It is to be noted that no stirring was carried out during the immersion mentioned above. After the immersion mentioned above, the pipe 91 and the coupling member 92 were cleaned with pure water. Then, as shown in FIG. 15(b), a silicone resin material was applied to the wall surface in the hole of the coupling member 92 and a part of the end surface of the pipe 91 for joining the coupling member 92, and the coupling member 92 was then attached to the end of the pipe 91. Then, the pipe 91 with the coupling member 92 attached was heated, maintained at 135° C. for 5 minutes, then maintained 180° C. for 20 minutes after further raising the heating temperature, and then naturally cooled. Thus, a plurality of samples each composed of a coupling pipe 90 with the coupling member 92 joined to the end of the pipe 91 was prepared as shown in FIG. 15(c).

Figure 16:
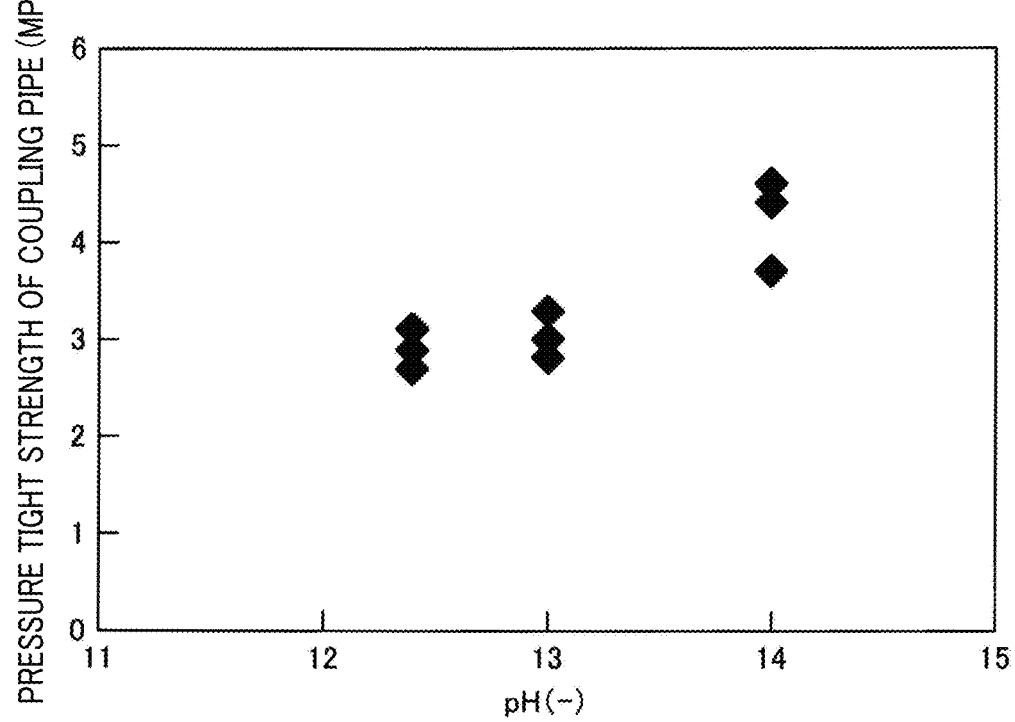
FIG. 16 is a diagram showing the relation between the pH of a silicate solution and the pressure-tight strength of a coupling pipe to which the bonded structure is applied in Experimental Example 6.

Each of the coupling pipe samples obtained was subjected to a pressure tightness test by a method of connecting an oil pipe to the coupling member and increasing the oil pressure to determine the rupturing pressure. The results are shown in FIG. 16. As shown in FIG. 16, the bonded structure according to the present disclosure was applied, thereby providing coupling pipes with high pressure-tight strength. In addition, the pressure-tight strength has been found to have a tendency to be increased with the increase in the pH of the silicate solution. This is believed to be because of promoting the dissolution of Al from the oxide film layer in the silicate solution and promoting the Al element in silicate glass deposited as a solid solution.

Experimental Example 7

Prepared were: a sample 7-1 obtained by treating, with an alkaline silicate solution, the surface of an aluminum substrate with an oxide film layer and applying an epoxy resin material thereto; and a sample 7-1C obtained by applying the epoxy resin material to the surface of an aluminum substrate with an oxide film layer without the above-mentioned treatment with the silicate solution. It is to be noted that the epoxy resin material used has a curing onset temperature of 145° C. Each of the samples was subjected to differential scanning calorimetry (DSC). The results are shown in FIGS. 17 and 18.

Figure 17:
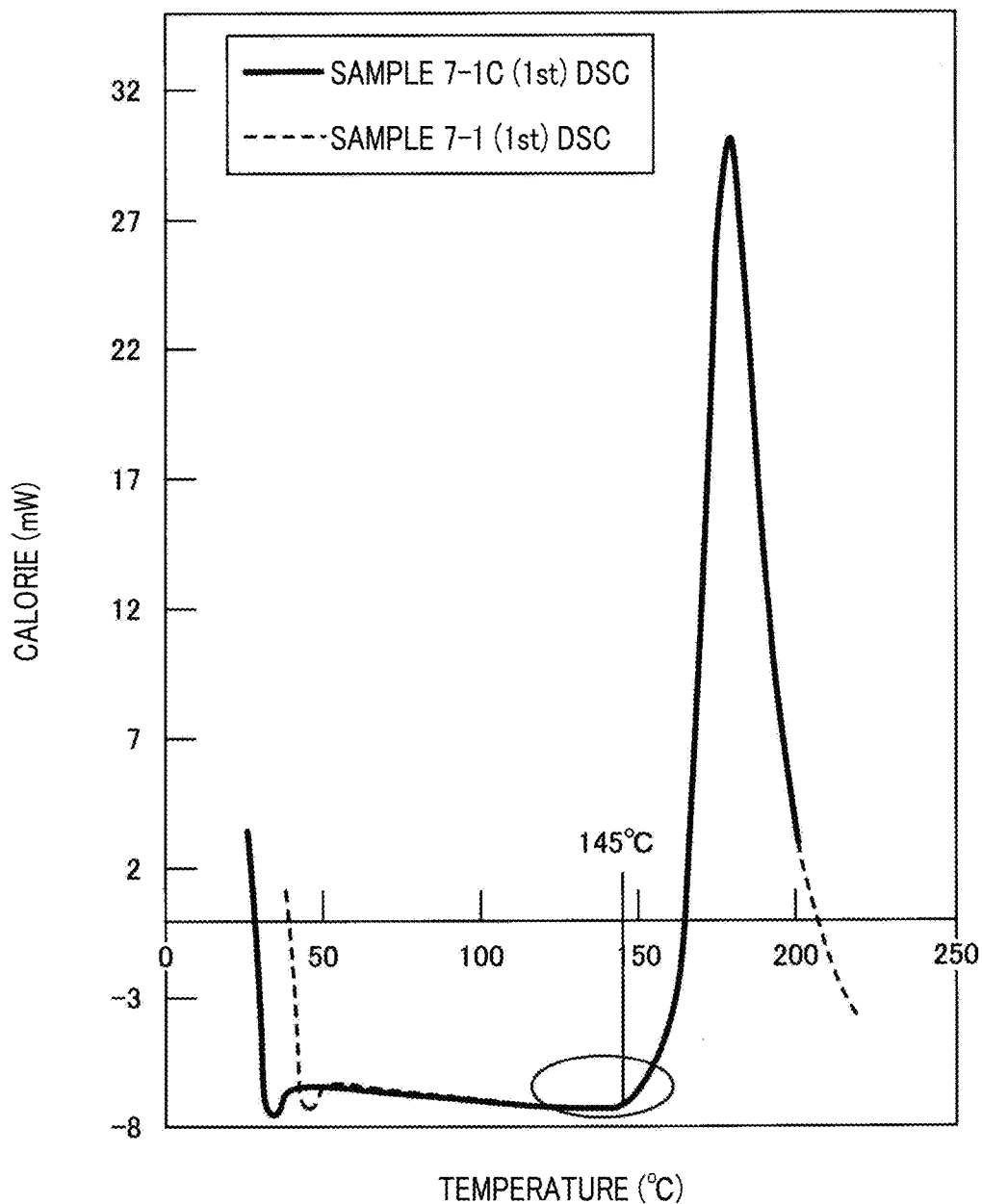
FIG. 17 shows the results of differential scanning calorimetry (DSC) for a sample 7-1 and a sample 7-1C in Experimental Example 7.
Figure 18:
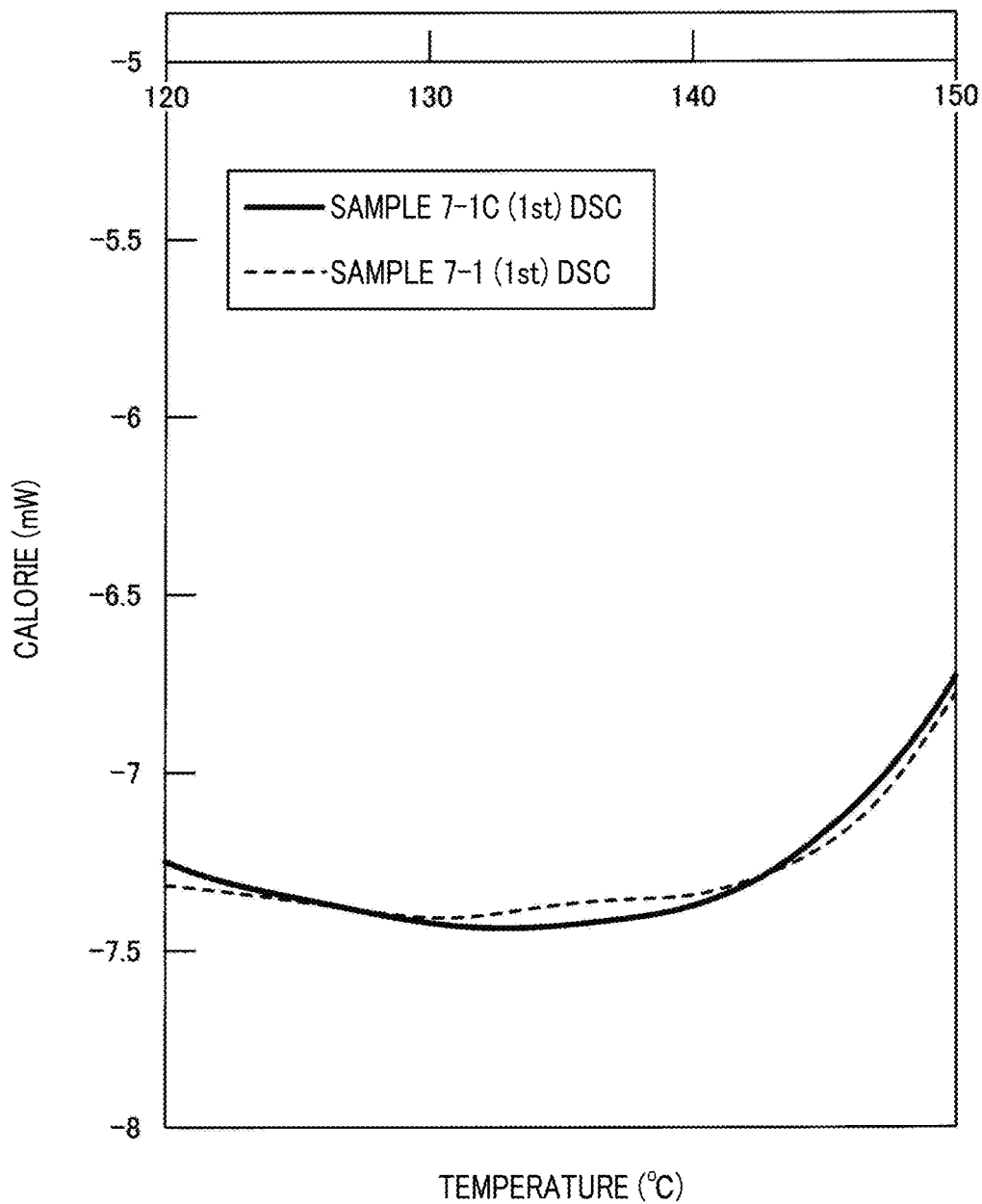
FIG. 18 is an enlarged diagram of the part surrounded by a circle in FIG. 17.

As shown in FIGS. 17 and 18, it has been confirmed that the sample 7-1 has an exothermic reaction caused at 135° C. lower than the curing onset temperature 145° C. of the epoxy resin material. From this result, it is determined that the temperature of the interfacial reaction between the thin film layer and the resin adhesive material is lower than the curing onset temperature of the epoxy resin material. Accordingly, after first causing the interfacial reaction between the thin film layer and the resin adhesive material, curing the resin adhesive material by further raising the heating temperature can be considered to allow the suppression of thermal degradation due to the overheated resin adhesive layer.

Experimental Example 8

In the same manner as in the preparation of the test piece 1-1 according to Experimental Example 1, multiple test pieces were prepared. In this example, however, the sodium silicate concentration and pH in the sodium silicate aqueous solution as a silicate solution were fixed respectively at 0.4 mol/L and 12.7. In addition, the liquid temperature of the sodium silicate aqueous solution and the time of immersion in the sodium silicate aqueous solution were varied. Then, the same tensile shear test as in Experimental Example 1 was carried out. In this example, the cases in which the tensile shear strength was 2000 N/cm$^2$ or more were regarded as "○", whereas the cases in which the tensile shear strength was less than 2000 N/cm$^2$ were regarded as "x". The results are shown in FIG. 19.

Figure 19:
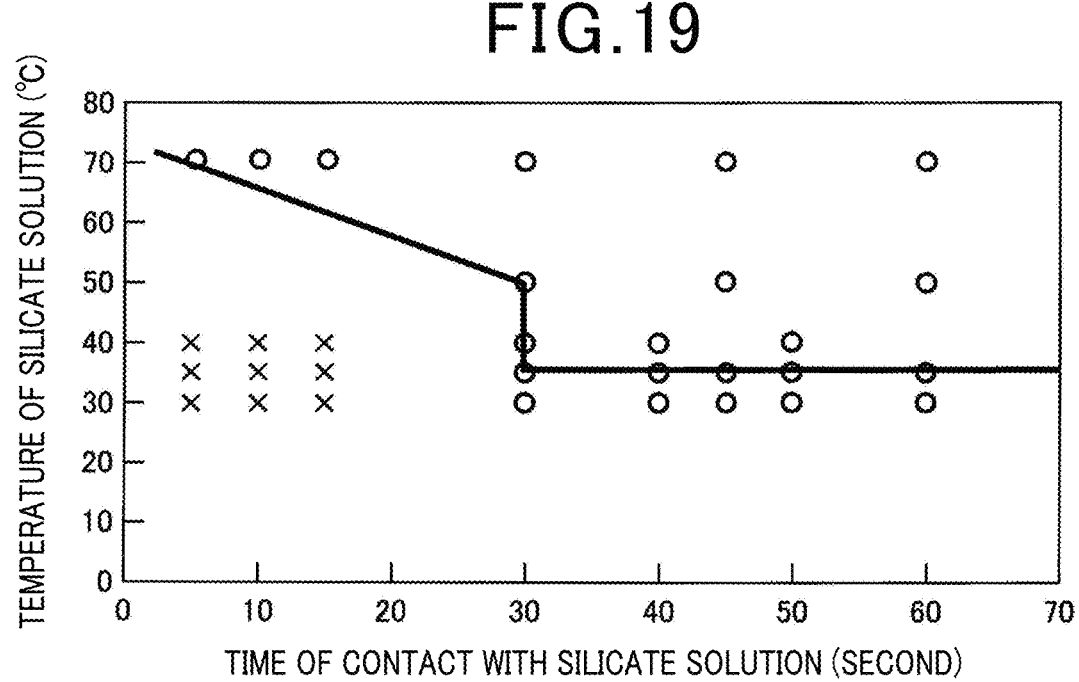
FIG. 19 is a diagram showing the relation between the time of contact with a silicate solution and the temperature of the silicate solution in Experimental Example 8.

As shown in FIG. 19, it is determined that the time of contact with the silicate solution is 15 seconds or longer, thereby achieving bonding strength of 2000 N/cm$^2$ or more. In addition, it is determined that the temperature of the silicate solution is 35° C. or higher, thereby achieving bonding strength of 2000 N/cm$^2$ or more.

The present disclosure is not to be considered limited to the respective embodiments or respective experimental examples mentioned above, and can be variously modified without departing from the scope of the disclosure. In addition, the respective configurations represented in the respective embodiments and the respective experimental examples can be optionally combined. More specifically, although the present disclosure is described with reference to the embodiments, it is understood that the present disclosure is not to be considered limited to the embodiments, the structures, or the like. The present disclosure encompasses even various modification examples and modifications in the equivalent scope. In addition, various combinations and forms, and furthermore, other combinations and forms including only one element or more or less besides the various combinations and forms are even considered to fall within the idea of the present disclosure.

Furthermore, the bonded structure mentioned above can be applied variously for, for example, joining a pipe and a pipe member (for example, a coupling member or a fixing member), joining pipes to each other, a resin coating on a member surface, a sealing material formed on a member surface (the use of the resin adhesive layer as a sealing material), joining members of a heat exchanger to each other, and joining a heat exchanger and a peripheral part for the exchanger, such as joining a heat exchanger and a pipe.

What is claimed is:

1. A bonded structure comprising:
    a first substrate comprising aluminum or an aluminum alloy;
    a first thin film layer formed on a surface of the first substrate; and
    a resin adhesive layer bonded to a surface of the first thin film layer,
    wherein the first thin film layer comprises silicate glass comprising a metal element with different valency from Si, as a solid solution,
    the resin adhesive layer comprises a resin comprising a structural site derived from ionic polymerization or a resin capable of dehydration condensation,
    the first thin film layer and the resin adhesive layer are bonded by ionic bonds or covalent bonds, and
    the first thin film layer includes a Ca content which is 5% by mass or less.

2. The bonded structure according to claim 1, wherein the metal element comprises Al.

3. The bonded structure according to claim 1, wherein the first thin film layer has a film thickness range of 2 nm or more and 25 nm or less.

4. The bonded structure according to claim 1, further comprising:
    a second substrate comprising aluminum or an aluminum alloy; and
    a second thin film layer formed on a surface of the second substrate,
    wherein the second thin film layer comprises the silicate glass,
    the resin adhesive layer is also bonded to a surface of the second thin film layer, and
    the first thin film layer and the resin adhesive layer are bonded by ionic bonds or covalent bonds.

5. The bonded structure according to claim 4, wherein a part of the surface of the second substrate, on which the second thin film layer is formed, is not covered with any oxide film layer.

6. The bonded structure according to claim 1, wherein a part of the surface of the first substrate, on which the first thin film layer is formed, is not covered with any oxide film layer.

7. The bonded structure according to claim 1, wherein the resin adhesive layer has a film thickness of 10 mm or less.

8. The bonded structure according to claim 1, wherein the resin adhesive layer has a film thickness of 2 mm or less.

9. A method for producing a bonded structure, the method comprising:
    a preparation step of bringing a first substrate comprising aluminum or an aluminum alloy with an oxide film layer comprising $Al_2O_3$ formed at a surface of the first substrate into contact with an alkaline silicate solution to convert the oxide film layer into a first thin film layer of silicate glass that has a metal element with different valency from Si, as a solid solution, thereby preparing the first substrate comprising the aluminum or the aluminum alloy with the first thin film layer formed at the surface of the first substrate;
    a stacking step of obtaining a stacked body wherein the first thin film layer at the first substrate and a resin adhesive material layer formed from a resin adhesive material that is subjected to curing to serve as a resin comprising a structural site derived from ionic polymerization or a resin capable of dehydration condensation are stacked in order; and a bonding step of heating the stacked body to cause ionic bonds or covalent bonds at an interface between the first thin film layer and the resin adhesive material layer, and further raising the heating temperature to cure the resin adhesive material layer, thereby forming a resin adhesive layer bonded to a surface of the first thin film layer, wherein the silicate solution has a silicate concentration range of 0.1 mol/L or more and 1.5 mol/L or less.

10. The method for producing the bonded structure according to claim 9, wherein the silicate solution has a pH range of 10 or more and 14 or less.

11. The method for producing the bonded structure according to claim 9, wherein the silicate solution has a temperature of 35° C. or higher.

12. The method for producing the bonded structure according to claim 9, wherein time of contact with the silicate solution is 15 seconds or longer.

* * * * *